United States Patent
Greenwald et al.

(10) Patent No.: US 10,860,568 B2
(45) Date of Patent: Dec. 8, 2020

(54) EXTERNAL DATA SOURCE LINKING TO QUERIES IN MEMORY

(71) Applicant: Arista Networks, Inc., Santa Clara, CA (US)

(72) Inventors: Michael Greenwald, Berkeley, CA (US); Stephen Schleimer, Campbell, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/274,143

(22) Filed: Sep. 23, 2016

(65) Prior Publication Data

US 2017/0286469 A1  Oct. 5, 2017

Related U.S. Application Data

(60) Provisional application No. 62/317,362, filed on Apr. 1, 2016.

(51) Int. Cl.
*G06F 16/00* (2019.01)
*G06F 16/23* (2019.01)

(52) U.S. Cl.
CPC ...... *G06F 16/2315* (2019.01); *G06F 16/2365* (2019.01)

(58) Field of Classification Search
CPC ........... G06F 17/30351; G06F 16/2315; G06F 16/2365
See application file for complete search history.

(56) References Cited

U.S. PATENT DOCUMENTS

| | | |
|---|---|---|
| 5,327,556 A | 7/1994 | Mohan et al. |
| 5,892,894 A | 4/1999 | Shiroshita et al. |
| 6,366,915 B1 | 4/2002 | Rubert et al. |
| 6,487,560 B1 | 11/2002 | LaRue et al. |
| 6,502,093 B1 | 12/2002 | Bhatt et al. |
| 6,732,124 B1 | 5/2004 | Koseki et al. |
| 6,834,276 B1 | 12/2004 | Jensen et al. |
| 6,910,070 B1 | 6/2005 | Mishra et al. |
| 7,177,859 B2 | 2/2007 | Pather et al. |
| 7,360,202 B1 | 4/2008 | Seshadri et al. |
| 7,590,666 B2 | 9/2009 | Korman et al. |
| 7,698,276 B2 | 4/2010 | Seshadri et al. |
| 8,150,959 B1 | 4/2012 | Bezdicek et al. |

(Continued)

OTHER PUBLICATIONS

Allan et al.; Record Architecture for a Relational Database Management System Supporting Null Values and Extensible Tables; IP.com; 2005.

(Continued)

*Primary Examiner* — Hau H Hoang
(74) *Attorney, Agent, or Firm* — Chamberlain, Hrdicka, White, Williams & Aughtry

(57) ABSTRACT

A network device includes a database that includes database entries, an external data that includes external data entries, an interpreter, and a standing query instance (SQI). The interpreter is programmed to convert an external data entry into a temporary database entry and provide the temporary database entry to the database. The SQI is programmed to obtain a database entry and the temporary database entry from the database and generate an output based on the database entry and the temporary database entry.

20 Claims, 19 Drawing Sheets

(56) References Cited

U.S. PATENT DOCUMENTS

| | | |
|---|---|---|
| 8,239,589 B1 | 8/2012 | Certain et al. |
| 8,631,034 B1* | 1/2014 | Peloski .............. G06F 17/5009 706/12 |
| 8,914,404 B1 | 12/2014 | Kim et al. |
| 9,009,289 B1 | 4/2015 | Jacob |
| 9,032,017 B1 | 5/2015 | Singh et al. |
| 9,049,484 B2 | 6/2015 | Major et al. |
| 9,208,032 B1 | 12/2015 | McAlister et al. |
| 9,529,682 B2 | 12/2016 | McAlister et al. |
| 10,042,674 B2 | 8/2018 | Brown et al. |
| 10,331,634 B2 | 6/2019 | Hu et al. |
| 2002/0004736 A1 | 1/2002 | Roundtree et al. |
| 2002/0007363 A1 | 1/2002 | Vaitzblit |
| 2002/0016827 A1 | 2/2002 | McCabe et al. |
| 2003/0018644 A1 | 1/2003 | Bala et al. |
| 2004/0098425 A1 | 5/2004 | Wiss et al. |
| 2004/0205048 A1 | 10/2004 | Pizzo et al. |
| 2005/0125528 A1 | 6/2005 | Burke, II et al. |
| 2005/0165731 A1 | 7/2005 | Funk |
| 2006/0143543 A1 | 6/2006 | Mandrell et al. |
| 2006/0206532 A1 | 9/2006 | MacLaurin |
| 2007/0050392 A1 | 3/2007 | Shukla et al. |
| 2007/0266331 A1 | 11/2007 | Bicker et al. |
| 2008/0104008 A1 | 5/2008 | Brantley et al. |
| 2008/0162849 A1 | 7/2008 | Savagaonkar et al. |
| 2008/0163073 A1 | 7/2008 | Becker et al. |
| 2008/0165943 A1 | 7/2008 | Gonzalez Lopez et al. |
| 2008/0208672 A1 | 8/2008 | Van Riel et al. |
| 2008/0208806 A1 | 8/2008 | Dalfo et al. |
| 2008/0300706 A1 | 12/2008 | Ruml et al. |
| 2008/0313637 A1 | 12/2008 | Youn et al. |
| 2009/0024752 A1 | 1/2009 | Shitomi |
| 2009/0063381 A1 | 3/2009 | Chan et al. |
| 2009/0234680 A1 | 9/2009 | Newton |
| 2009/0300528 A1 | 12/2009 | Stambaugh |
| 2010/0161555 A1* | 6/2010 | Nica ................ G06F 17/30383 707/624 |
| 2010/0281102 A1 | 11/2010 | Chinta |
| 2011/0055231 A1 | 3/2011 | Huck et al. |
| 2011/0214050 A1 | 9/2011 | Stambaugh |
| 2011/0314047 A1 | 12/2011 | Koronthaly et al. |
| 2011/0320620 A1 | 12/2011 | Cutler et al. |
| 2012/0005220 A1 | 1/2012 | Schindlauer et al. |
| 2012/0023077 A1 | 1/2012 | Kann et al. |
| 2012/0112893 A1 | 5/2012 | Bezdicek et al. |
| 2012/0190325 A1 | 7/2012 | Abu-Hakima |
| 2012/0310906 A1 | 12/2012 | Miller et al. |
| 2013/0041781 A1 | 2/2013 | Freydberg |
| 2013/0150007 A1 | 6/2013 | Wang et al. |
| 2013/0188515 A1 | 7/2013 | Pinheiro et al. |
| 2013/0325609 A1 | 12/2013 | Sokolov et al. |
| 2014/0095535 A1 | 4/2014 | Deshmukh |
| 2014/0229221 A1 | 8/2014 | Shih et al. |
| 2014/0310258 A1 | 10/2014 | Tian |
| 2014/0317084 A1* | 10/2014 | Chaudhry ......... G06F 17/30457 707/713 |
| 2015/0009818 A1 | 1/2015 | Xiao et al. |
| 2015/0019701 A1 | 1/2015 | Dumant et al. |
| 2015/0149631 A1 | 5/2015 | Lissack |
| 2015/0193477 A1 | 7/2015 | Dumant et al. |
| 2015/0207794 A1 | 7/2015 | Lee et al. |
| 2015/0302149 A1 | 10/2015 | Whitsitt et al. |
| 2015/0317399 A1 | 11/2015 | Akselrod et al. |
| 2016/0098450 A1 | 4/2016 | Tandon et al. |
| 2016/0283545 A1 | 9/2016 | Benke et al. |
| 2016/0299799 A1 | 10/2016 | De Smet |
| 2016/0308940 A1 | 10/2016 | Procopio et al. |
| 2016/0350392 A1 | 12/2016 | Rice et al. |
| 2017/0063948 A1 | 3/2017 | Shroff et al. |
| 2017/0177697 A1 | 6/2017 | Lee |
| 2017/0213257 A1 | 7/2017 | Murugesan et al. |
| 2019/0258613 A1 | 8/2019 | Hu et al. |

OTHER PUBLICATIONS

IEEE 100—The Authoritative Dictionary of IEEE Standard Terms; Published by Standards Information Network, IEEE Press; 7th Edition; pp. 1133-1134; 2000.

What is a Database Schema? Published by Database Guide Jun. 6, 2016.

* cited by examiner

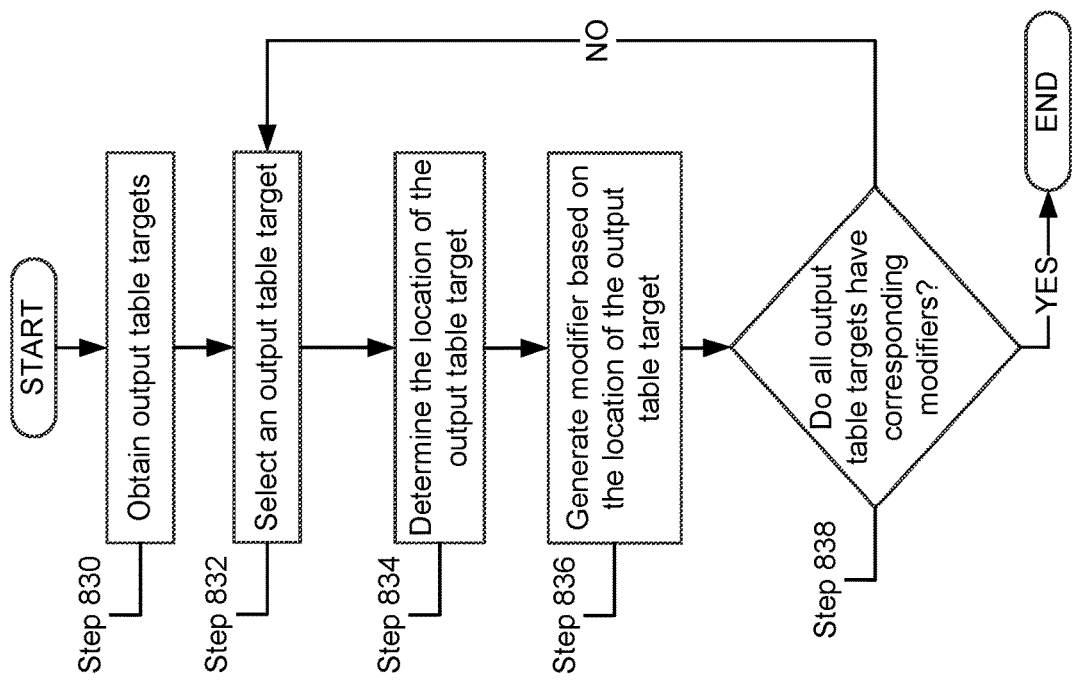

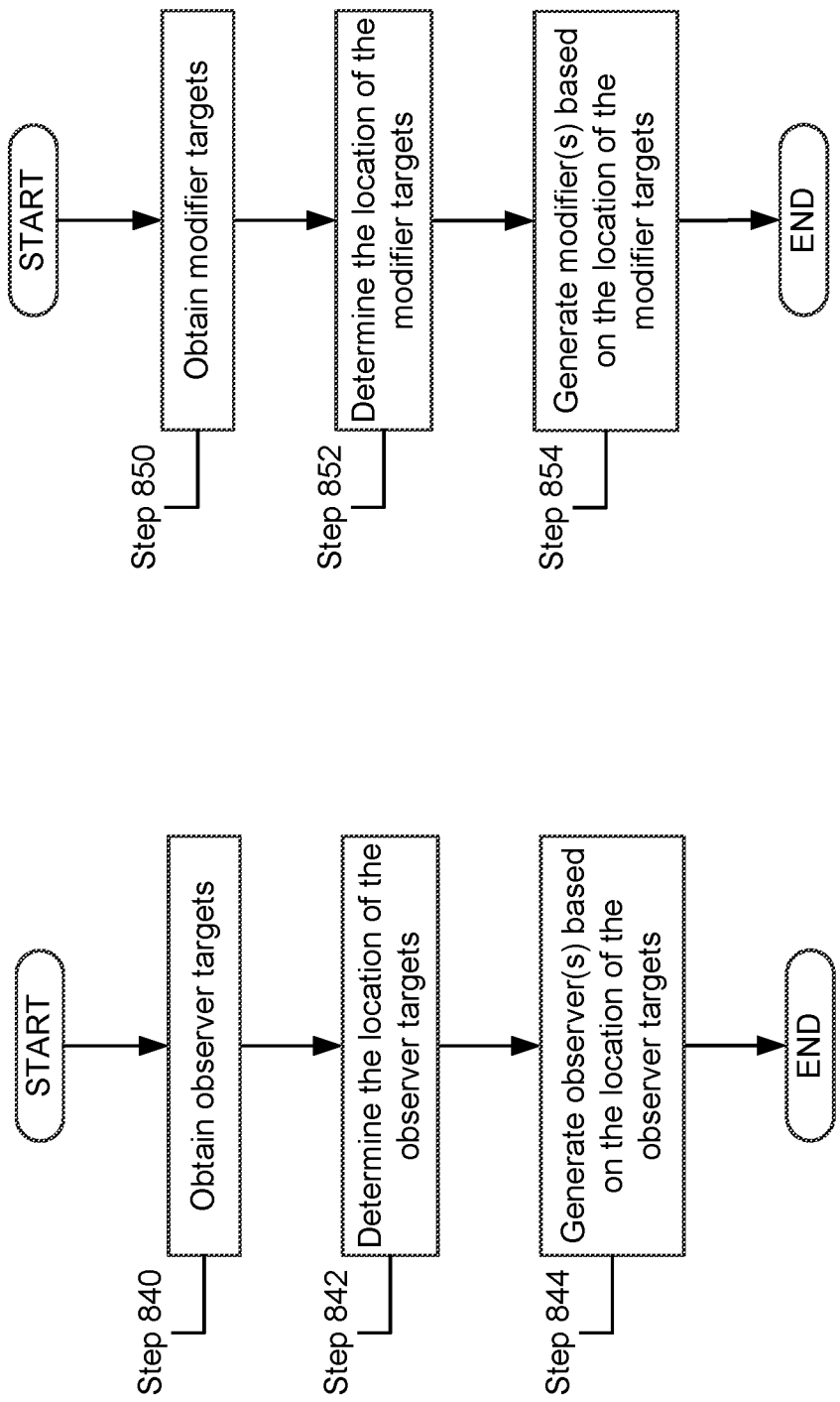

EXTERNAL DATA SOURCE LINKING TO QUERIES IN MEMORY

BACKGROUND

Computing devices may store information in memory. In a network environment, multiple computing devices may interact as components of a system. Sometimes computing devices in a first location need to access information stored in the memory of a second computing device in a second location. Similarly, computing devices in a first location may need to write information to the memory of a second computing device.

SUMMARY

In one aspect, a network device in accordance with embodiments of the invention includes a database that includes database entries, an external data that includes external data entries, an interpreter, and a standing query instance (SQI). The interpreter is programmed to convert an external data entry into a temporary database entry and provide the temporary database entry to the database. The SQI is programmed to obtain a database entry and the temporary database entry from the database and generate an output based on the database entry and the temporary database entry.

In one aspect, a method of operating a network device in accordance with embodiments of the invention includes obtaining, by a standing query service manager (SQSM) of the network device, a first standing query instance (SQI) request specifying an input table, the input table comprises a database entry of a database and an external data entry of an external data; generating, by the SQSM, a SQI that includes a SQI input table and a compiled query that, when executed, produces an output based on the SQI input table; making a determination, by the SQSM, that the SQI input table includes the database entry in response to generating the SQI; generating, by the SQSM, an observer programmed to notify the SQI of a change to the database entry in response to the determination; and generating, by the SQS manager, a link between the SQI input table and the external data entry in response to the determination.

In one aspect, a method of operating a network device in accordance with embodiments of the invention includes obtaining, by a standing query instance (SQI), a database entry and a temporary database entry from a database, the temporary database entry is based on an external data entry of an external data; and generating, by a compiled query of a SQI, an output based on the database entry and the temporary database entry.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 8D shows a flowchart of a method of generating modifiers in accordance with one or more embodiments of the invention.

FIG. 8E shows a flowchart of a second method of generating observers in accordance with one or more embodiments of the invention.

FIG. 8F shows a flowchart of a second method of generating modifiers in accordance with one or more embodiments of the invention.

DETAILED DESCRIPTION

Figure 1A:
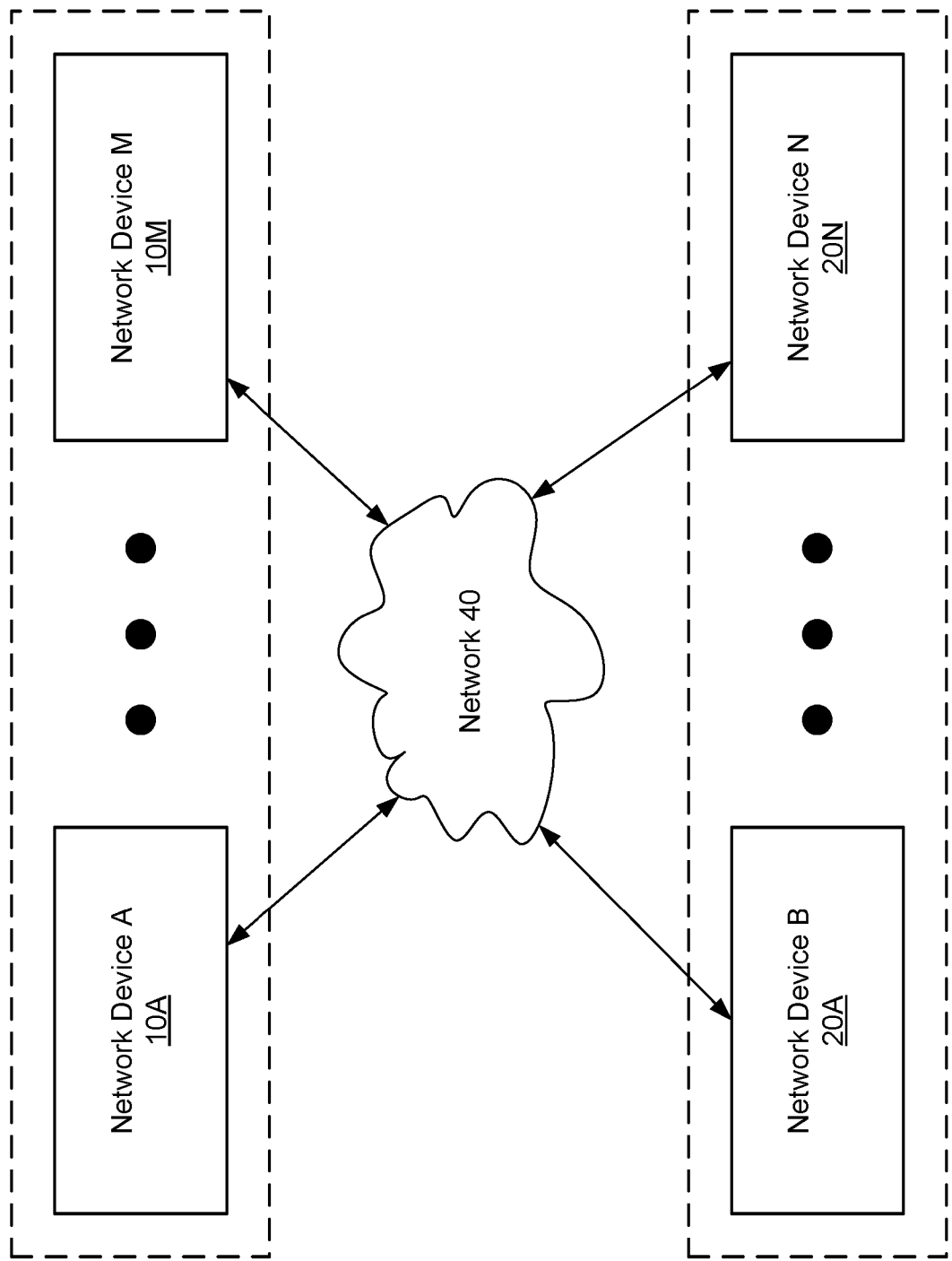
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to methods and systems for storing and/or accessing information stored in one or more network devices. Each of the network devices may be a router, switch, multilayer switch, or other device that may support network communications or may interact with other devices through the network.

The stored information may relate to a state of the network device, a state of a network to which a network device is connected, and/or a state of one or more services operating on a network device. For example, the stored information may be a temperature of a component of the network device. The component may be, for example, a processor. In another example, the stored information may be an accessibility of another network device. The stored information may be other information without departing from the invention.

A network device in accordance with one or more embodiments of the invention may include a database. The database may include tables that store information. In one or more embodiments of the invention, the database may span across multiple network devices, e.g., portions of the database may be stored on storage of a first network device and other portions of the database may be stored on storage of a second network device. In one or more embodiments of the invention, duplicate copies of information stored in the database may be stored on the first network device and the second network device. In one or more embodiments of the invention, a database planner may manage the consistency of the database across one or more network devices, e.g., may make copies of information stored on a first network device.

In one or more embodiments of the invention, data that is external to the database may also exist on the network device. The external data may be in a format that is different than a format of information stored in the database, e.g., external data entries may have a different format that database entries. The external data may be linked to the database by an interpreter that dynamically generates temporary database entries based on external data entries and thereby enable the database to provide access to both the external data and database entries to entities interacting with the database. The temporary database entries may have a format that is the same as the database entries.

The network device may include a standing query service (SQS) manager. The SQS manager may generate and/or manage instances of SQSs that operate on information stored in the database and/or the external data. Instances of SQS may be generated in response to requests from other entities. In one or more embodiments of the invention, the other entities may be agents executing on the network device or agents executing on other network devices.

Each instance of a SQS may include an input table and a compiled query that generates an output. The compiled query may operate on entries of the input table to produce the output. The input table may include database entries and/or external data entries.

Output generated by a compiled query of a standing query instance (SQI) may be incremental or complete. A complete output may be an output that is based on all of the elements of the input table while an incremental output may be based on the elements of the input table that have changed since the output was last computed. The incremental output may be used in conjunction with the last computed output to determine the complete output. Generating an incremental output to determine a complete output may reduce the computational and/or bandwidth requirements to generate a complete output. For example, generating an incremental output may only require retrieval of a portion of the input table entries rather than all of the input table entries thereby reducing computational and/or communication bandwidth.

In one or more embodiments of the invention, an instance of a SQS may generate an output in response to a change in a value of a database entry listed in the input table of the SQI. The SQI may generate the output based on the change in the value of the database entry but not other database entries listed in the input table of the SQI, e.g., an incremental output in output. The complete output may be generated based on the incremental output and the last determined output stored in an output table.

In one or more embodiments of the invention, the incremental output may also be based on any entry of the input table listing an external data entry. As will be discussed in greater detail below, SQIs may not be notified of changes to external data and, accordingly, the external data may have changed since the last outputs of the SQIs were generated by the SQIs. To generate an incremental output, each external data entry may be retrieved in addition to the database entry that changed and thereby initiated the output generation. The incremental output may be generated based on each of the retrieved database entries and external data entries.

In one or more embodiments of the invention, the instance of the SQS may generate an output after one or more predetermined changes to the input table have occurred, e.g., a specific set of changes to more than one database entry. In one or more embodiments of the invention, the instance of the SQS may produce an output at a predetermined time, e.g., periodically or at one or more predetermined times.

SQIs may be notified of changes to the value of database entries listed in an input table of the SQI by observers. Observers may monitor entries of the database and/or output tables of other SQIs stored in the database and notify SQIs associated with the observers of the changes. In one or more embodiments of the invention, the observers may propagate changes to the database and/or output tables to input tables associated with an observer. In one or more embodiments of the invention, observers may also propagate changes to entries of the database to one or more agents of the network device. In some embodiments of the invention, the agents to which the observers propagate changes are located on network devices other than the network device that includes the database.

In one or more embodiments of the invention, the output produced by the compiled query of a SQI may be propagated to an output table by a modifier. Modifiers may monitor compiled queries of SQIs and propagate the output of the queries to output tables in response to changes in the output of the compiled query. In one or more embodiments of the invention, the output table may be a portion of the database, e.g., a table of the database or entries of a table of the database.

In one or more embodiments of the invention, the SQSM may generate observers associated with an SQI when generating the SQI. The observers may be based on each entry of the input table that includes a database entry.

In one or more embodiments of the invention, the SQSM may generate a linking between any input table entries that includes an external data entry. The linking may enable external data entries to be propagated to the compiled query of an associated SQI and thereby enable the compiled query to generate an output. In one or more embodiments of the invention, the linking may be a temporary database entry of the database.

FIG. 1A shows an example of a network in accordance with one or more embodiments of the invention. The example network shown in FIG. 1A includes network devices (10A-10N) operably connected to one another. Each of the aforementioned network devices may be interconnected by a network (40) supporting one or more networking protocols. For example, network device 10A may be connected by operable communication links to network devices 10M, 20A, and 20N as indicated by the arrows. The network (40) may include any number of network devices without departing from the invention. Additionally, each of the aforementioned network devices may include any number of communication links without departing from the invention. In one embodiment of the invention, the network (40) may be the Internet. In another embodiment of the invention, the network (40) may be an intranet. The intranet may be connected to the Internet.

Figure 1B:
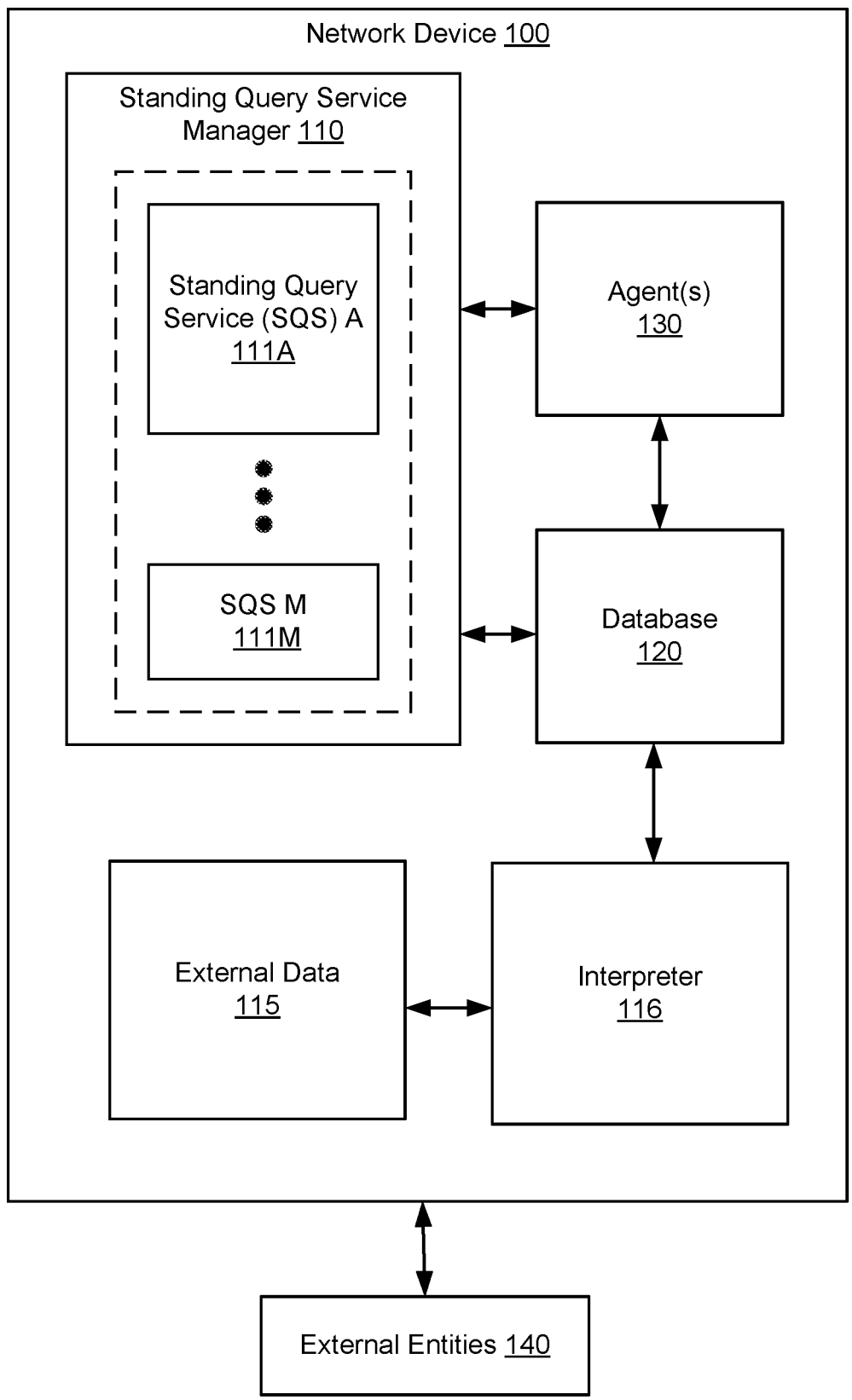
FIG. 1B shows a diagram of a network device in accordance with one or more embodiments of the invention.

FIG. 1B shows a network device (100) in accordance with one or more embodiments of the invention. The network device (100) may be programmed to store information in a database (120) and generate outputs based on the information stored in the database (120) by one or more instances of SQSs. In one or more embodiments of the invention, the outputs may also be based on an external data (115) stored on the network device.

The network device (100) may be a physical device that includes non-transitory storage, memory (e.g. Random Access Memory), and one or more processors. The non-transitory storage may include instructions which, when executed by the one or more processors, enable the network device (100) to perform the functions described in this application and shown in FIGS. 8A-10A.

The network device (100) may include a SQS manager (110), one or more standing query services (111A-111M), external data (115), and interpreter (116), a database (120), and a one or more agents (130). The network device (100) may be operably connected to one or more entities (140). The entities (140) may be, for example, other network devices, servers, or computing devices accessible by a network. Each of the components of the network device (100) is described below.

The network device (100) may include a database (120). The database (120) may be a managed storage database that controls read and/or write access to information stored in database entries. Read access to the database (120) may be provided by one or more observers and write access to the database may be provided by one or more modifiers. Observers and modifiers may be dynamically generated and removed. Observers and modifiers may be registered with the database (120) and thereby notify the database (120) of their presence. In turn, the database (120) may notify the observer and modifiers of changes to the database (120). The interaction of observers and modifiers with the database are described in greater detail with respect to FIGS. 6-7.

Figure 5A:
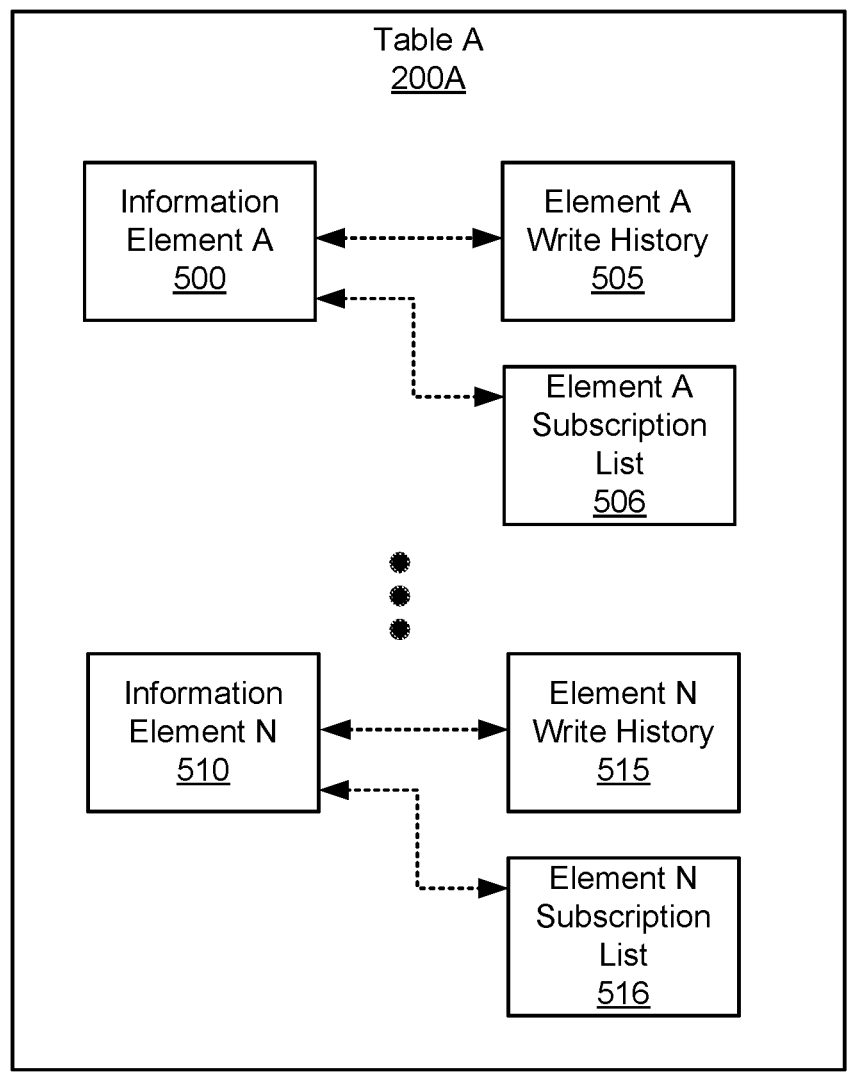
FIG. 5A shows a table of a database in accordance with one or more embodiments of the invention.
Figure 5B:
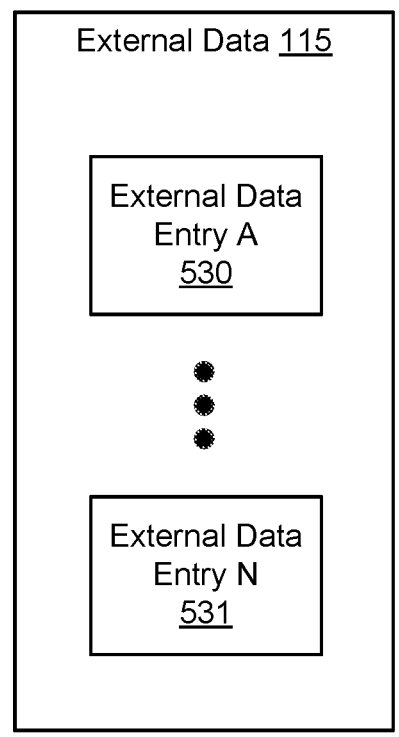
FIG. 5B shows an example external data in accordance with one or more embodiments of the invention.

The database may also provide access to external data (115) as shown in FIG. 5B. The external data may include any number of external data entries (530-531). The entries may be of any format and may be stored on the network device. The format of the external data entries may be different than that of the format of an entry of the database (120).

Returning to FIG. 1B, an interpreter (116) may dynamically generate a temporary database entry based on one or more entries of the external data (115) in response to a request from the database (120). The generated temporary database entry may have a format that is the same as the format of the database (120). Thus, the database (120) may provide entries of the database and temporary database entries in response to requests from entities and thereby provide a method of retrieving entries of both the database and the external data having an identical format for the requesting entities.

Unlike database entries, the temporary database entries may not be stored in the database (120) and may merely be passed to requesting entities by the database (120). Thus, the database (120) may not notify observers, modifiers, and/or any other entities of changes to external data entries of the external data (115). Consequently, as will be discussed in greater detail below, all input table elements of a SQI listing an external data entry are obtained when generating an incremental or complete output because the value of an external data entry may have changed without notification from the database (120).

Figure 2:
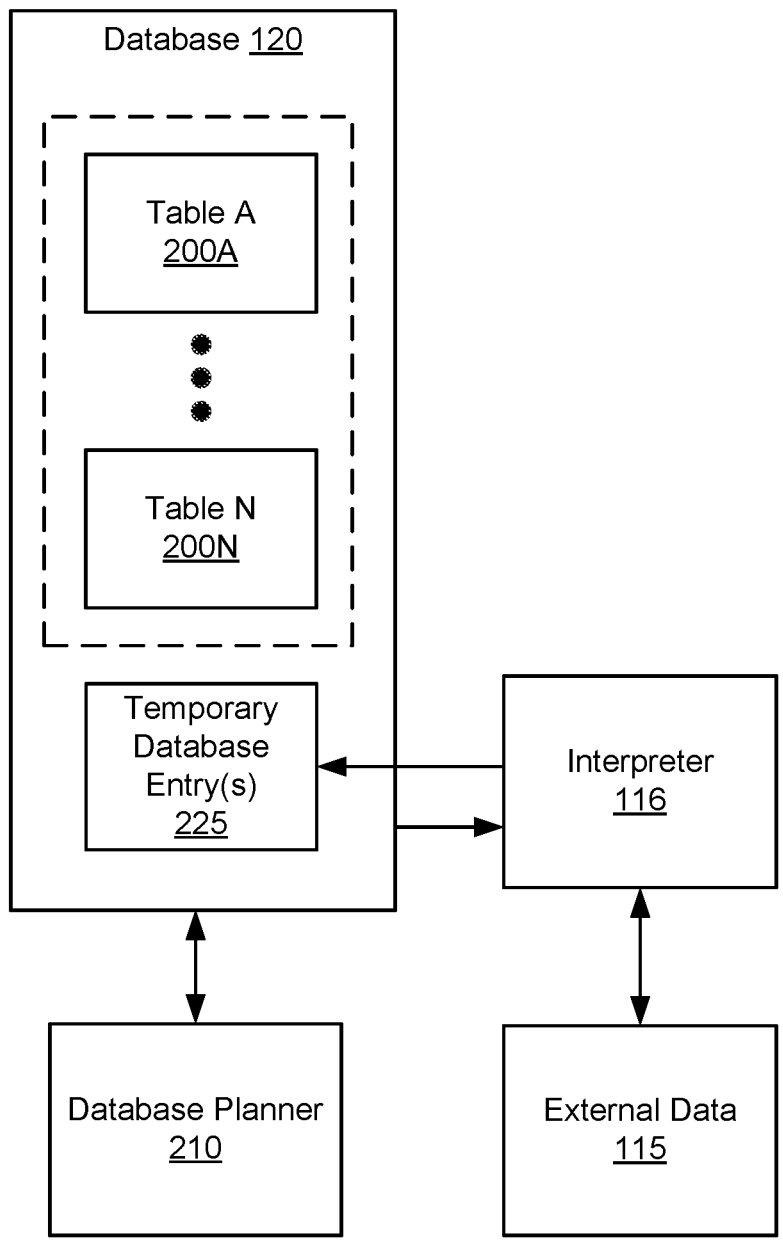
FIG. 2 shows a database accordance with one or more embodiments of the invention.

In one or more embodiments of the invention, the database (120) may include one or more tables (200A-200N) and one or more temporary database entries (225) as shown in FIG. 2. The tables (200A-200N) may be data structures for storing information on a computer readable storage medium of the network device (100). Each element of each table may include one or more information elements. Information elements may be, for example, integers, characters, floating point values, addresses, or any other type of data.

FIG. 5A shows an example of Table A (200A) in accordance with one or more embodiments of the invention. Table A (200A) includes a number of information elements (500, 510), e.g., database entries. As discussed above, each information element may include data of varying type.

In one or more embodiments of the invention, the database (120) may include a write history associated with each information element of each table of the database (120). The write history of an information element of a table may include a list of modifications, e.g., writes, to the element and the time of each modification. The list of modifications may include all of the modifications or a portion of the modifications. For example, information element A (500) may have an associated element A write history (505) that includes one or more modifications that have been made in a sequence to information element A (500). While the element A write history (505) is shown as being a part of Table A (200A) in FIG. 5A, the write history of each information element of each table may be stored in other locations without departing from the invention.

In one or more embodiments of the invention, the database (120) may include a subscription list associated with each information element of each table of the database (120). The subscription list associated with each element may be a list of observers and/or modifiers, registered with the database, that interact with the associated information element. When an information element is updated, e.g., written to by a modifier, the database may notify each entity listed in the subscription list associated with the information element that the information element was updated.

In one or more embodiments of the invention, each subscription list associated with each information element of the database (120) may include a history list position of each observer. Observers may read information from the database at predetermined times, periodically, and/or in real-time in response to notifications of updates to information from the database (120). When an observer requests to read information from an information element of the database (120), the database (120) may return one or more modifications listed in the write history list, associated with the information element, having a write time that is later than a write time of the history list position. By sending one or more of the modifications having a write time that is later than the write time of the history list position, information written to the information element may be provided to the observer and thereby propagated to any requesting entities. The database (120) may update the history list position of the observer as the observer reads modifications from the history list.

In one or more embodiments of the invention, when an observer requests to read information from an information element of the database (120), the database (120) may continue to return modifications until the history list position of the observer is updated to the most recent modification.

In an example, information element A (500) may have an associated element A subscription list (506) and information element N (510) may have an associated element N subscription list (516). Each of the subscription lists (506, 516) may include a listing of observers that are observing information elements A (500) and N (510), respectively. Each of the subscription lists (506, 516) may also include the history list position of each observer with respect to element A write history (505) and element N write history (515). The history list position of each observer with respect to each write history may be different, e.g., a first observer may have a history list position that is at a later time than a history list position of a second observer that is observing the same information element as the first observer. Thus, each information element may have a different subscription list and each entity listed in the subscription list may have a different history list location.

In one or more embodiments of the invention, the database (120) may remove elements of a write history of an information element when all of the entities subscribed to the information element have read the element. Removing the elements of the write history that have been read by all subscribed entities may reduce the storage requirements of the database.

While the element A subscription list (506) and element N subscription list (516) are shown as being a part of Table A (200A) in FIG. 5A, the subscription list associated with each information element of each table may be stored in other locations without departing from the invention.

Figure 3:
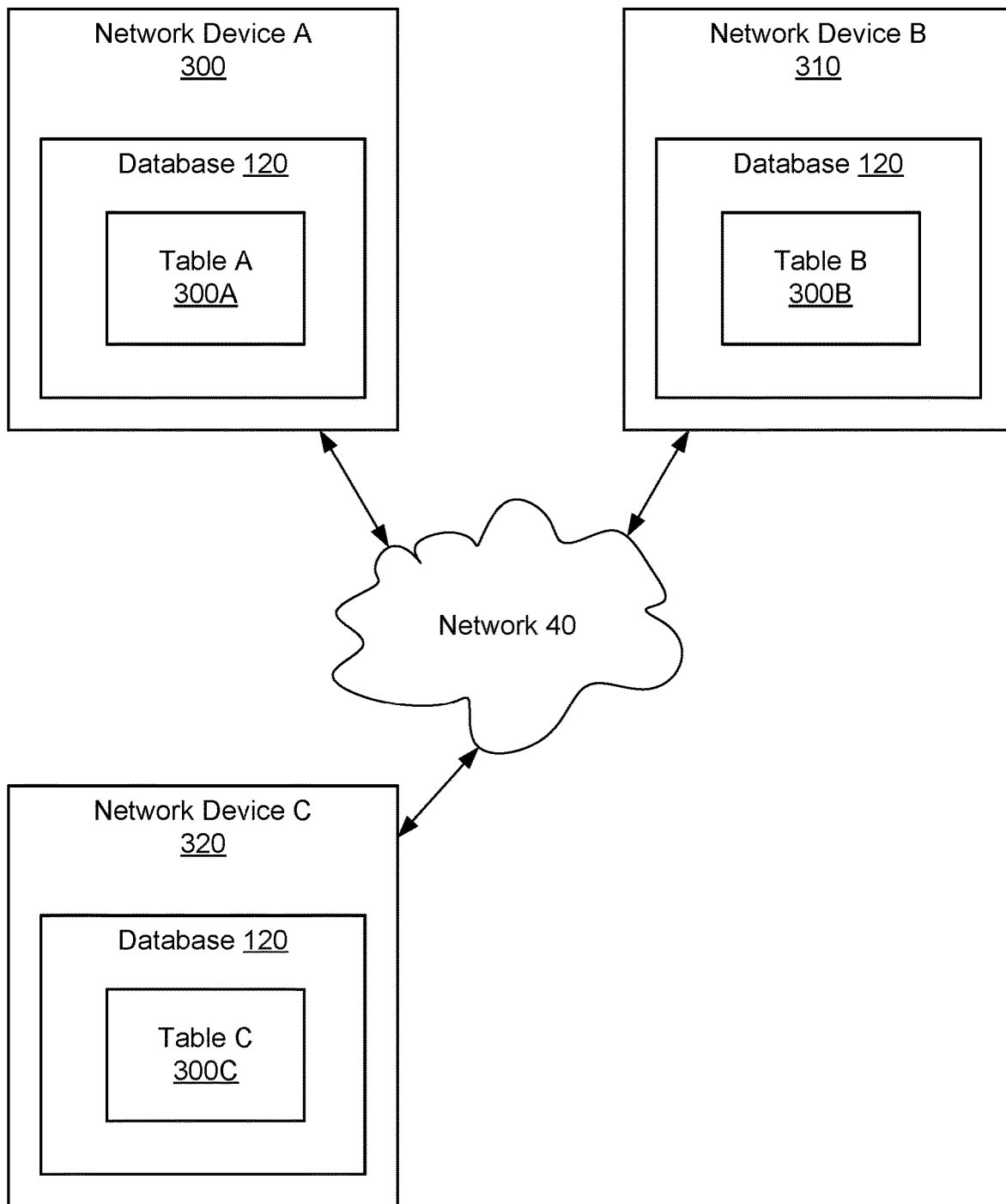
FIG. 3 shows a diagram of a database distributed across multiple network devices in accordance with one or more embodiments of the invention.
Figure 4:
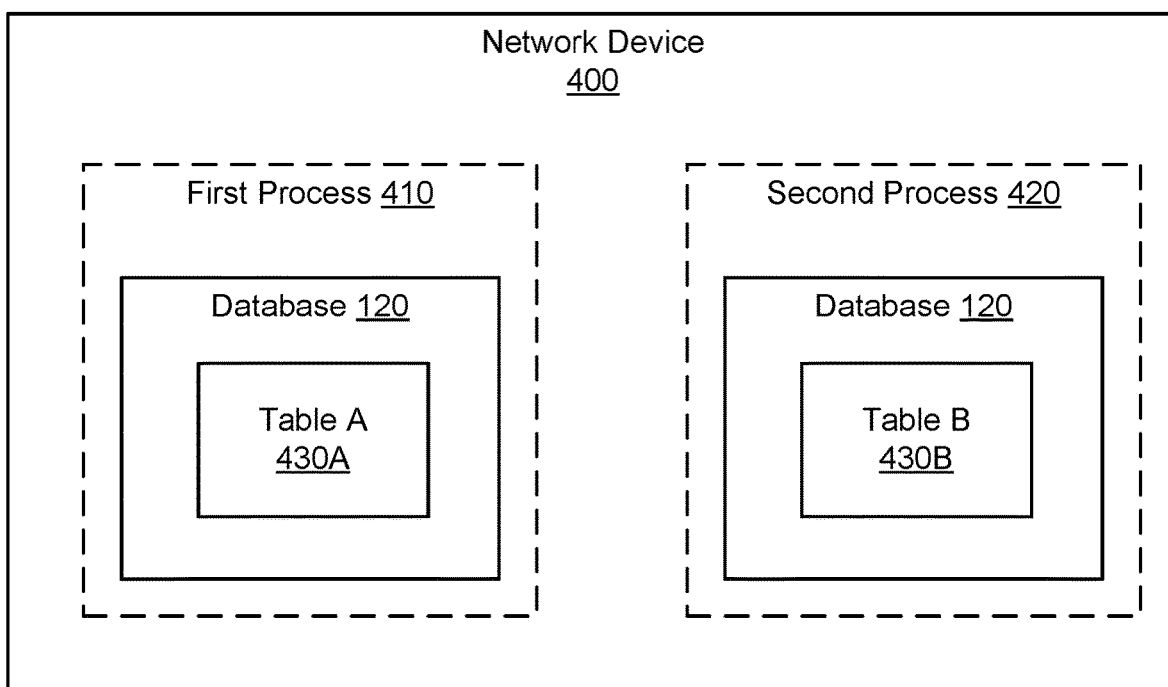
FIG. 4 shows a diagram of a database distributed across multiple processes in accordance with one or more embodiments of the invention.

Returning to FIG. 2, the database (120) may include tables (200A-200N) that are located on multiple network devices and/or are stored in multiple address spaces. FIGS. 3 and 4 illustrate examples of tables distributed across multiple devices and/or multiple address spaces.

In one or more embodiments of the invention, the database (120) may span across multiple network devices as shown in FIG. 3. FIG. 3 shows an example of a database (120) spanning across multiple network devices (300, 310, 320) connected by a network (40) in accordance with embodiments of the invention. The database (120) spans across each of the network devices and includes tables (300A, 300B, and 300C) stored on a computer readable storage medium of each network device, respectively. For example, Table A (300A) may be stored on a computer readable storage medium of network device A (300), Table B (300B) may be stored on a computer readable storage medium of network device B (310), and/or Table C (300C) may be stored on a computer readable storage medium of network device C (320). Each of the tables (300A, 300B, 300C) may include the same information, e.g., duplicate, or different information, e.g., non-duplicative. In some embodiments, each of the tables (300A, 300B, 300C) may include duplicate and non-duplicate information.

For example, each of the tables (300A, 300B, 300C) may include a first entry that comprises the maximum data transmission speed of the network (40). Table A (300A) may also include a second entry, not present in either Table B (300B) or Table C (300C), that comprises the current temperature of a processor of network device A (300).

In one or more embodiments of the invention, the database (120) may span across multiple processes in separate address spaces executing on a single network device. FIG. 4 shows an example of a database (120) spanning across a first process (410) and a second process (420) of a network device (400) in accordance with embodiments of the invention. The database (120) spans across each of the processes (410, 420) and includes tables (430A, 430B) stored on a computer readable storage medium of the network device (400). Table A (430A) and Table B (430B) may be stored in different address spaces allocated to the first process (410) and the second process (420), respectively. Each of the tables (430A, 430B) may include the same information, e.g., duplicate, or different information, e.g., non-duplicative. In some embodiments, each of the tables (430A, 430B) may include duplicate and non-duplicate information.

For example, each of the tables (430A, 430B) may include a first entry that comprises a maximum inter-process memory transport rate of the network device (400). Table A (430A) may also include a second entry, not present in Table B (430B), that comprises the quantity of storage allocated to the first process (410).

Returning to FIG. 2, the database (120) may include temporary database entry(s) (225). The external database entry(s) (225) may be temporary entries of the database that are based on external data. As discussed above, the database (120) may provide access to both database entries and external data (115). The database entries and external data entries may have a different format. When the database (120) receives a request to read an external data entry, the database may send a request to an interpreter (116) to generate a temporary database entry (225). In response to the request, the interpreter (116) may generate a temporary database entry (225) and forward it to the database (120). The database (120) may provide the temporary database entry (225) to the requesting entity.

As discussed above, the network device may include an interpreter (116). The interpreter (116) may generate temporary database entry(s) (225) in response to requests from the database (120). The interpreter (116) may generate the temporary database entry(s) (225) by reading an external data entry identified by the request and reformatting the external data entry into the format of database entries.

Also, as discussed above, the network device may include an external data (115). The external data (115) may be data stored on a storage of the network device. In one or more embodiments of the invention, the external data (115) may be stored on another network device and linked to the network device by an operable connection. The external data (115) may be of any type and of any format. The external data (115) may include any number of external data entries. The external data entries may have a format that is different than the format of the database entries. The external data entries may have a format that is different than temporary database entries generated by the interpreter.

The network device may include a database planner (210). The database planner (210) may manage the database (120). Managing the database (120) may comprise maintaining the location of each table of the database, external data, and facilitating inter network device and/or inter process memory transfers between tables of the database. For example, an agent present on a first network device may request to read data from a table or external data that is present on a second network device. In response to the request from the agent, the database planner (210) may provide the location of the table or external data on the second network device and thereby enable the agent to retrieve the data from the second table. In one or more embodiments of the invention, the database planner (210) may generate an observer, in response to requests from entities that request to read database entries. The generated observer may retrieve data from a table of the database and provide the data to the requesting entity as describe with respect to FIG. 5A. In one or more embodiments of the invention, the database planner (210) may generate a linking, in response to requests from entities that request to read external data entries. In some embodiments of the invention, managing the database (120) may include maintaining the location of each table of the database across shared memory.

In one or more embodiments of the invention, the database planner (210) may include a data structure, e.g., a list, tree, or other structure, that includes the location of each unique entry of the database (120) and external data entry. A unique entry may be an entry of a table or external data where information is first written into the database (210). The information may be subsequently written to other entries of other tables of the database as duplicative information. The data structure may include the information necessary to determine the location of each unique entry of the database (120) or external data and thereby enable data included in any entry of the database (120) to be retrieved and or duplicated to other tables of the database (120).

In one or more embodiments of the invention, the database planner (210) may be executing on the network device and comprise functionality to update each table of the database (120) in response to a change in an entry of the database. For example, the database planner (210) may include functionality to identify changes to entries of a first table of the database and propagate those changes to the other tables of the database by writing duplicative information to each of the other tables. In one or more embodiments of the invention, the database planner (210) may include functionality to monitor entries of a first table and notify other tables of changes to the entries of the first table. In response to the notification, the other tables may note that the entries of the first table have changed and may thereby notify, in response to requests from agents or other entities, the agents or other entities that entries of the first table have changed.

Thus, the database planner (210) may enable the database (120) to provide information to an agent or other entity of the location of any entry of any table of the database (120).

Returning to FIG. 1B, in one or more embodiments of the invention, the SQS manager (110) may include functionality to manage SQSs. The SQS manager (110) may manage one or more SQSs (111A-111M).

Managing SQSs may include generating instances of SQSs in response to requests from agents (130), generating observers associated with instances of the SQSs (111A-111M), and/or generating modifiers associated with the instances of the SQSs (111A-111M). The SQS manager (110) may generate instances of SQSs (111A-111M), observers, and modifiers based on information stored in or derived from the database (120) and/or a database planner (210, FIG. 2). Methods of managing the instances of the SQSs are further described with respect to FIGS. 8A-E and SQSs are further described with respect to FIGS. 6A-7B.

In one or more embodiments of the invention, the SQS manager (110) may be an embedded hardware device. The embedded hardware device may be, for example, a field programmable gate array (FPGA), application specific integrated circuit (ASIC), and/or digital signal processor (DSP). Other embedded hardware devices may be used without departing from the invention. In one or more embodiments of the invention, the embedded hardware device may be a component of an external entity (140) and provide the functionality by remotely communicating with the network device (100) by a network.

In one or more embodiments, the SQS manager (110) may comprise instructions, stored on a non-transitory computer readable storage medium, that when executing on a processor of the network device (100) cause the network device (100) to perform the functionality of the SQS manager (110). In one or more embodiments of the invention, the SQS manager (110) may be executing on processors of external entities (140) and cause the network device (100) to perform the functionality of the SQS manager (110) by remotely communicating with the network device (100) by an operable connection.

Figure 6:
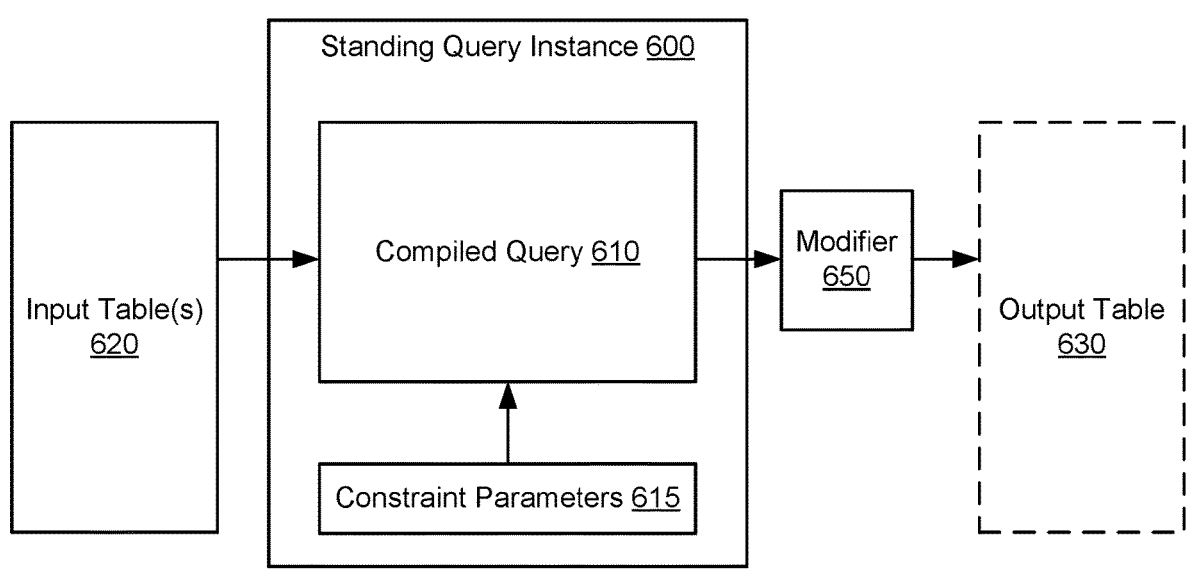
FIG. 6 shows a diagram of a standing query instance in accordance with one or more embodiments of the invention.

Each of the SQSs (111A-111M) may include one or more query instances (QI)s. An example of a QI (600) in accordance with one or more embodiments of the invention is shown in FIG. 6. The QI (600) includes a compiled query (610) and one or more constraint parameters (615). Each of the components of the example QI (600) is described below.

The QI (600) may include a compiled query (610). The compiled query (610) may include instructions that, when executed by a processor, generate an output based on information included and/or derived from an input table (620) associated with the QI (600) and constraint parameters (615) of the QI (600). In one or more embodiments of the invention, the compiled query (610) may generate output in response to a change in value of one or more entries of the input table (620). More specifically, the compiled query (610) may generate an output in response to a notification of a change in value of a database entry listed in the input table. In one or more embodiments of the invention, the compiled query (610) may generate output at predetermined times. In one or more embodiments of the invention, the predetermined times may be periodic, e.g., the compiled query (610) may generate an output every five seconds.

The constraint parameters (615) may modify the manner in which the compiled query (610) generates an output, e.g., scales output, excludes input used to determined output, modifies weight of an input, etc.

The input table (620) may be a data structure including one or more elements. The elements of the input table (620) may be generated by one or more observers and/or linkings, as will be discussed in greater detail with respect to FIG. 7.

Output generated by the compiled query (610) may be sent to a modifier (650) associated with the QI (600). The modifier (650) may propagate the output of the SQI (610) to the output table (630) associated with the QI (600). The output table (630) will be discussed in greater detail with respect to FIG. 7.

Returning to FIG. 1B, the network device (100) may include one or more agents (130) executing on the network device (100) in accordance with one or more embodiments of the invention. The agents (130) may interact with the database (120) of the network device (100), e.g., the agents may desire to read and/or write data to and/or from the database (120). For example, the agents (130) may generate data to be stored in the database (120) or may need to read information from the database (120). In response to read or write requests from the agents (130), the database (120) and/or the database planner (210, FIG. 2) may generate observers or modifiers as required to facilitate the transfer of information between the database (120) and the agents (130).

The agents (130) may also interact with the SQS manager (110) of the network device (100). An agent (130) may send a request for a new instance of a SQS to the SQS manager (110) to determine the information derived from the database and/or external data. The SQS manager (110) may generate a new SQI in response to the request and one or more observers and modifiers to propagate information generated by the new SQI to the agent (130).

Figure 7:
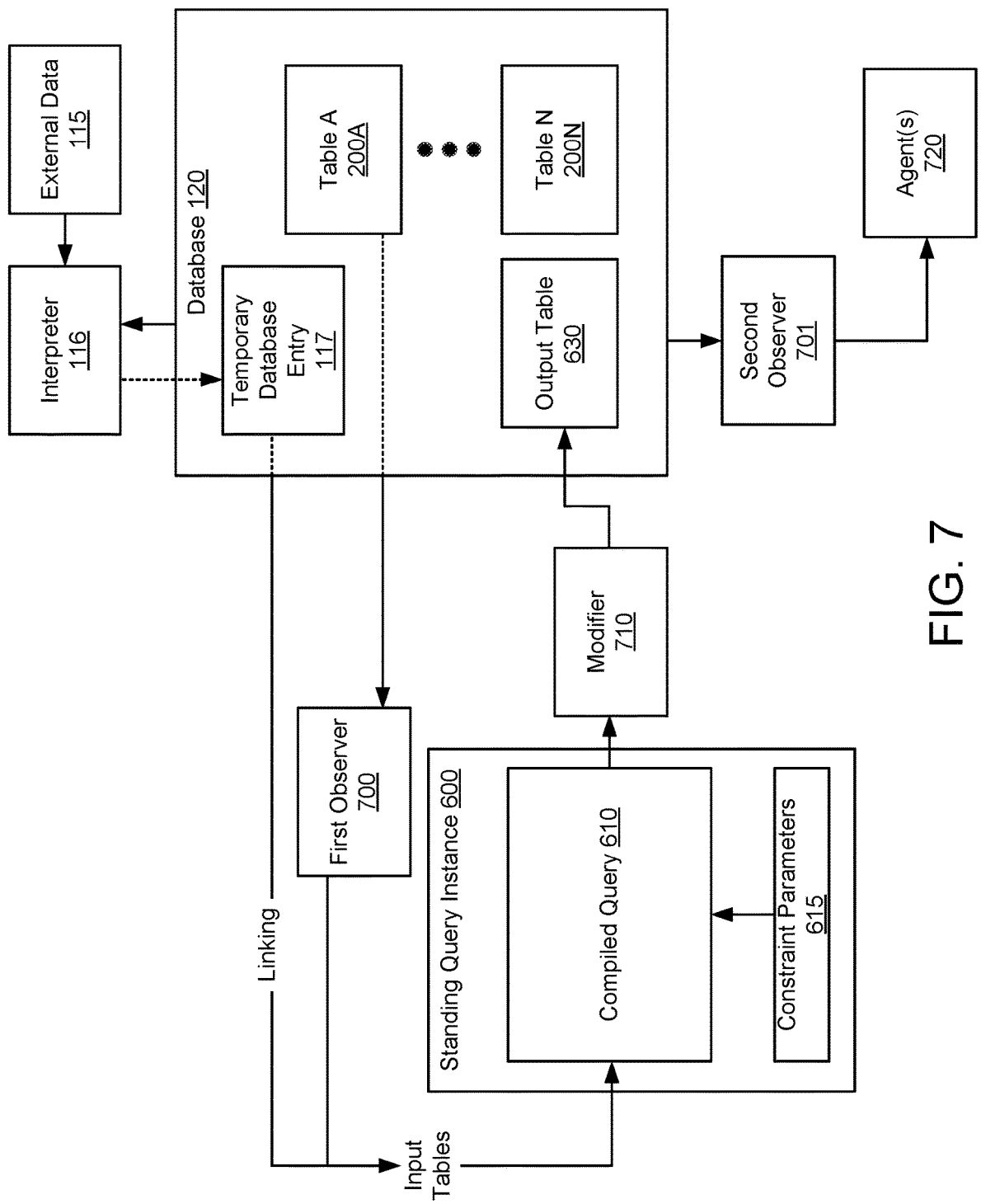
FIG. 7 shows a diagram of a standing query interacting with a database in accordance with one or more embodiments of the invention.

FIG. 7 shows the example of a QI (600), shown in FIG. 6, interacting with a database (120) in accordance with one or more embodiments of the invention. In the example shown in FIG. 7, the QI (600), observers (700, 701), and modifier (710) were generated in response to a request from an agent (720). The request included a query type to be generated, constraint parameters, and a list of one or more information elements of the database (120) to be used as input to the compiled query (610).

A first observer (700) was generated to read information from the database (120) and supply the information to the compiled query (610) via an input table. More specifically, the first observer (700) observes information elements, e.g., database entries, stored in one or more tables (200A-200N) of the database and propagates the information to the compiled query (610).

A second observer (701) was generated to read output, generated by the compiled query (610), stored in the output table (630) associated with the QI (600) and supply the output to the agent (720) that requested the QI (600).

In addition to the observers, a linking between the input table of the QI (600) and the external data (115) was generated. The linking includes a temporary data base entry (117). As discussed above, temporary database entries are based on external data and thereby enable the database (120) to provide both entries of the database (120) and external data entries to entities.

A modifier (710) was generated to propagate output generated by the compiled query (610) to the output table (630). While the output table (630) is shown as a separate table in FIG. 7, the output table (630) may be a portion of any table of the database (120) without departing from the invention.

Thus, as shown in FIG. 7, SQIs interacting with the database (120) read both database entries and external data entries from the database, by way of temporary database entries, and write information to the database by modifiers. Similarly, agents interacting with the database (120) also read and write information to or from the database by observers and modifiers.

Figure 8A:
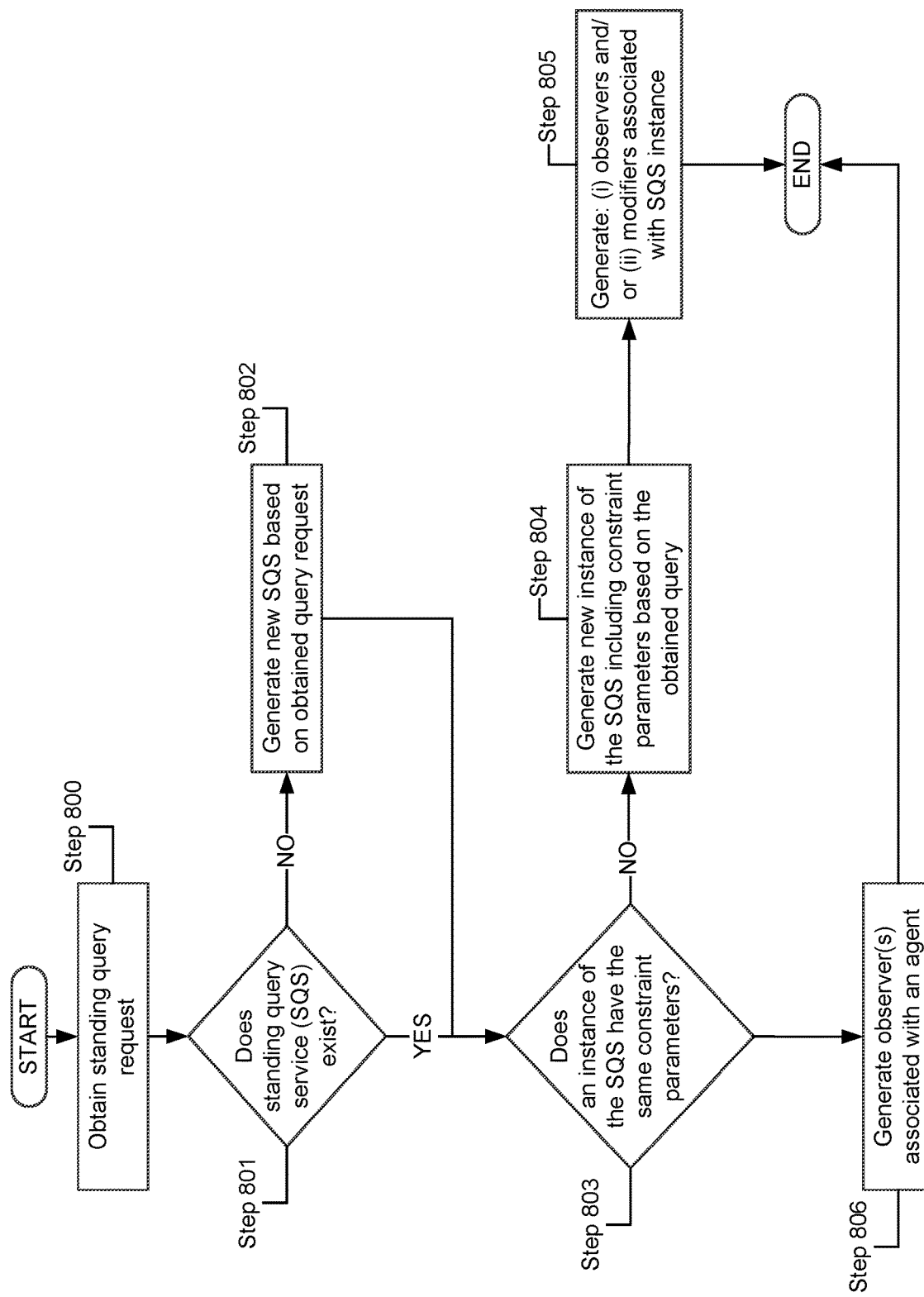
FIG. 8A shows a flowchart of a method of generating a standing query instance in accordance with one or more embodiments of the invention.

FIG. 8A shows a flowchart in accordance with one or more embodiments of the invention. The method depicted in FIG. 8A may be used to generate instances of SQSs in response to requests from agents in accordance with one or more embodiments of the invention. One or more steps shown in FIG. 8A may be omitted, repeated, and/or performed in a different order among different embodiments.

In Step 800, a SQS manager of a network device obtains a request for a new instance of a SQS. The SQS manager may obtain the request from a message from an agent. The agent may be executing on the network device on which the SQS manager is executing. The request may include a query type, one or more constraint parameters, and elements of an input table that identifies database entries and/or external data entries on which the new instance of the SQS is to operate.

In Step 801, the SQS manager determines whether a SQS matching the query type included in the request exists on the network device. If the query type does not match an existing SQS, the method proceeds to Step 804. If the query type does match an existing SQS, the method proceeds to Step 806.

In Step 802, the SQS manager generates a new SQS based on the obtained query request. Specifically, the SQS manager may generate a new SQS including the query type indicated in the obtained query request, an input table based on the elements of the input table included in the query request, and constraint parameters that may be used by the compiled query to produce output.

In one or more embodiments of the invention, generating a new SQS may include compiling a query. In one or more embodiments of the invention, generating a new SQS may include linking compiled byte code. In one or more embodiments of the invention, the behavior of the compiled query may be altered by the constraint parameters.

In Step 803, the SQS manager determines whether the constraint parameters of an instance of a SQS matches the constraint parameters, included in the obtained request, exists on the network device. If the constraint parameters of the obtained request do not match the constraint parameters of an existing instance of a SQS, the method proceeds to Step 808. If the constraint parameters of the obtained request do match the constraint parameters of an existing instance of a SQS, the method proceeds to Step 806.

In Step 804, the SQS manager generates a new SQI of the SQS, corresponding to the query type included in the obtained request, including constraint parameters based on the constraint parameters included in the obtained request. Specifically, the SQS manager may make a copy the compiled query associated with the SQS corresponding to the query type included in the obtained request and constrain the compiled query based on the constraint parameters included in the obtained request.

In one or more embodiments of the invention, the constraint parameters change the behavior of the compiled query. The constraint parameters may be variables, utilized by the compiled query, which change the output produced by the compiled query when operating on the same input.

In Step 805, the SQS manager generates observers, linkings, and/or modifiers associated with the new SQI. The SQS manager may generate one or more observers associated with the new SQI that both notify the compiled query of changes to database entries listed in the input table of the new SQI and supplies the compiled query of the new SQI with the database elements on which the compiled query operates. The observers may supply the data to an input table of the new SQI as shown, for example, in FIG. 7.

The SQS manager may also generate one or more linkings associated with the new SQI that supplies the compiled query with external data entries on which the compiled query operates. In one or more embodiments of the invention, the linkings are temporary database entries that are dynamically generated by an interpreter and based on external data entries. Specifically, the database, in response to a request from the new SQI to read an external data entry, may request that a temporary database entry be generated by the interpreter. The interpreter may generate the temporary database entry based on the external data entry identified in the request from the new SQI. The database may forward the temporary database entry to the new SQI once received from the interpreter. The database may delete the temporary database entry once forwarded to the new SQI.

The SQS manager may also generate one or more modifiers associated with the SQI that propagates output generated by the compiled query of the new SQI. The modifiers may propagate the output generated by the compiled query to an output table associated with the new SQI. In some embodiments of the invention, the modifiers may propagate the output generated by the compiled query to an external data. The external data may be data that is generally accessible. The external data may be writable external data.

In one or more embodiments of the invention, the SQS manager may generate one or more observers associated with an agent from which the request was obtained in Step 800. The observer may be linked with the output table where data generated by the compiled query is stored and the agent from which the request was obtained in Step 800. The observer may propagate changes to the output table to the agent and thereby notify the agent of new output generated by the new instance of the SQI requested by the agent.

Returning to Step 803, the method may proceed to Step 806 if an existing SQI includes constraint parameters that are the same as those included in the SQ request obtained in Step 800.

In Step 806, the SQS manager generates observer(s) associated with an agent from which the new SQS request was obtained in Step 800. The observer may be linked with the output table where data generated by the existing SQI identified in Step 806 is stored and the agent from which the request was obtained in Step 800. The observer may propagate changes to the output table to the agent and thereby notify the agent of new output generated by the existing instance of the SQS. In other words, if an existing SQI includes the same constraint parameters as those of the request, an observer may be generated to propagate results of the existing SQI to the agent rather than generating a new SQI and a new modifier.

In one or more embodiments of the invention, the observer may propagate changes to the output table to an agent in response to a notification from the database that the element of the database the observer is observing, e.g., one or more elements of the output table, have changed. In one or more embodiments of the invention, the observer may propagate changes to the output table to an external data controller. The external data controller may provide access to the changes to the output table or otherwise use the changes to the output table without impacting the operation of the database.

In one or more embodiments of the invention, the observer may poll the database at predetermined times to determine if the observed elements of the database have changed. If the database indicates the observed elements of the database have changed, the observer may receive each modification to the observed elements from the database and propagate the modifications to the agent from which the SQ request was obtained in Step 800. In one or more embodiments of the invention, the predetermined times may be periodic, e.g., every 5 seconds. In one or more embodiments of the invention, the predetermined times may be intermittent.

Thus, the methods shown in FIG. 8A may be used to generate observers, modifiers, and SQIs in response to requests from agents.

Figure 8B:
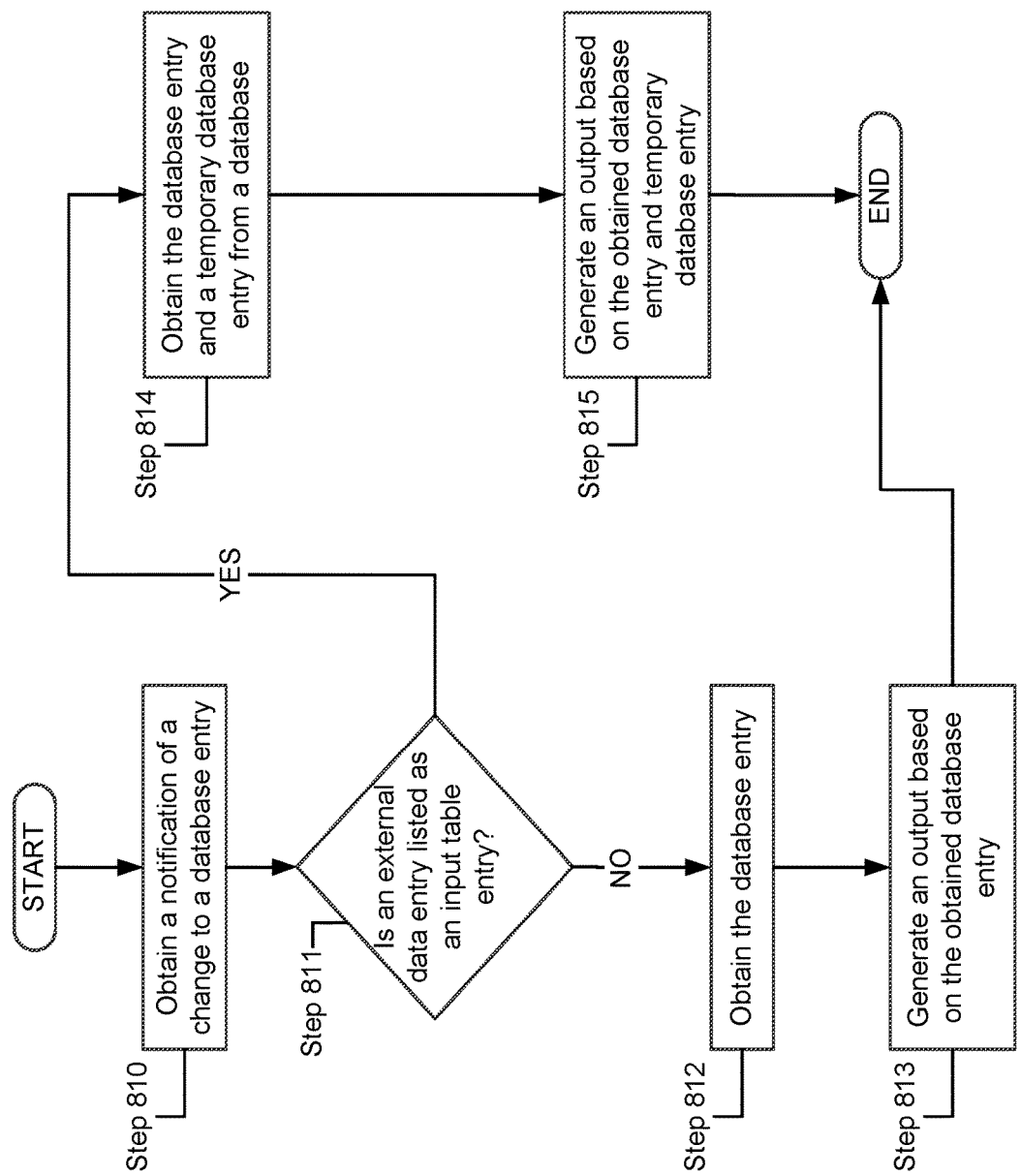
FIG. 8B shows a flowchart of a method of executing a compiled query of a standing query instance (SQI) in accordance with one or more embodiments of the invention.

FIG. 8B shows a flowchart in accordance with one or more embodiments of the invention. The method depicted in FIG. 8B may be used to execute a SQI in accordance with one or more embodiments of the invention. One or more steps shown in FIG. 8B may be omitted, repeated, and/or performed in a different order among different embodiments.

In Step 810, a SQI of a network device obtains a notification of a change to a database entry. The notification may be obtained by a message from an observer associated with the SQI.

In Step 811, the SQI determines whether the input table of the SQI includes any external data entries. If the input table includes an external data entry, the method proceeds to Step 814. If the input table does not include any external data entries, the method proceeds to Step 812. The request may indicate that the output is to be non-materialized by, for example, including a string identifier, a bit identifier, or any other method of identification.

In Step 812, the SQI obtains the database entry. In one or more embodiments of the invention, the SQI may obtain the database entry by receiving it from an observer that is observing the database entry. In one or more embodiments of the invention, the SQI may obtain the database entry by requesting the database entry from the database.

In Step 813, the SQI generates output based on the obtained database entry. In one or more embodiments of the invention, the SQI may generate the output by executing a compiled query of the SQI. In one or more embodiments of the invention, a modifier, associated with the SQI, may store the output in an output table. In one or more embodiments of the invention, the output table may be a table of the database.

Returning to Step 811, as noted above, the method may proceed to step 814 if the input table of the SQI includes an external data entry.

In Step 814, the SQI obtains the database entry and a temporary database entry from the database. The temporary database entry may be based on the external database entry listed in the input table of the SQI. The temporary database entry may have a format that is the same as the format of the database entry. The format of the temporary database entry may be different than a format of the external data entry on which the temporary database entry is based. In one or more embodiments of the invention, the temporary database entry is generated by an interpreter.

In one or more embodiments of the invention, the SQI may obtain the database entry by receiving it from an observer that is observing the database entry. In one or more embodiments of the invention, the SQI may obtain the database entry by requesting the database entry from the database.

In Step 815, the SQI generates an output based on the obtained database entry and temporary database entry. In one or more embodiments of the invention, the SQI may generate the output by executing a compiled query of the SQI. In one or more embodiments of the invention, a modifier, associated with the SQI, may store the output in an output table. In one or more embodiments of the invention, the output table may be a table of the database. In one or more embodiments of the invention, the observer may propagate changes to the output table to an external data controller. The external data controller may provide access to the changes to the output table or otherwise use the changes to the output table without impacting the operation of the database.

In some embodiments of the invention, multiple steps of the method shown in FIG. 8B may be combined. For example, in some embodiments, Steps 813 and 815 may be combined into a single step.

Thus, the method shown in FIG. 8B may be used by a SQI to generate an output when the input table includes external data entries.

Figure 8C:
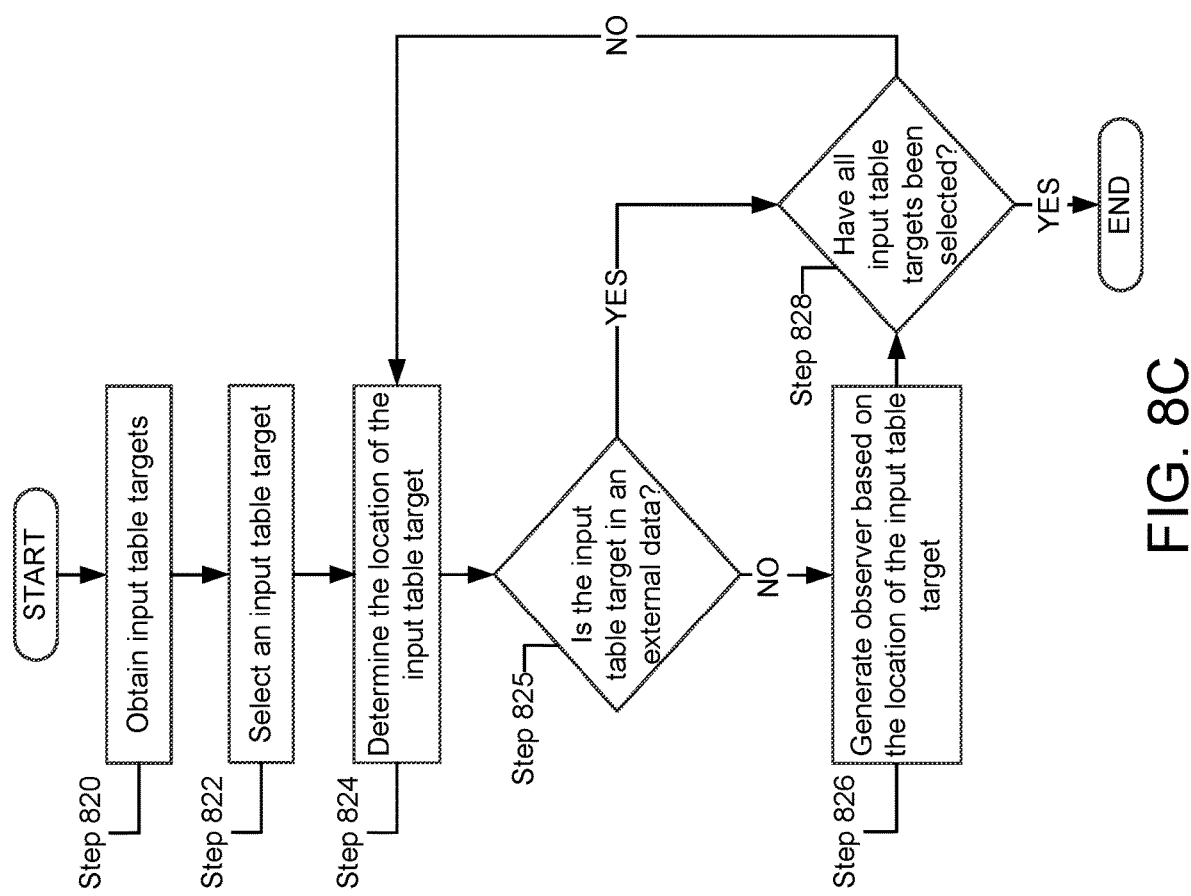
FIG. 8C shows a flowchart of a method of generating observers in accordance with one or more embodiments of the invention.

FIG. 8C shows a flowchart in accordance with one or more embodiments of the invention. The method depicted in FIG. 8C may be used to generate observers in response to requests for SQIs in accordance with one or more embodiments of the invention. One or more steps shown in FIG. 8C may be omitted, repeated, and/or performed in a different order among different embodiments.

In Step 820, a SQS manager of a network device obtains one or more input table targets. The input table targets may be one or more database entries and/or external data entries on which a requested SQI operates. The input table targets may be obtained from a request from an agent requesting a new SQI.

In Step 822, the SQS manager selects one of the input table targets. The SQS manager may mark the selected input table target as being selected.

In Step 824, the SQS manager determines the location of the input table target selected in Step 822. The SQS manager may determine the location of the input table by target by requesting the location from a database planner (210, FIG. 2) that manages the database (120, FIG. 2). The location of the input table target may be an entry of a table of the database (120, FIG. 2) or an external data entry.

In Step 825, the SQS manager determines whether the input table target is a database entry or external data entry based on the location of the input table target. If the input table target is a database entry, the method proceed to Step 826. If the input table target is an external database entry, the method proceeds to step 828.

In Step 826, the SQS manager generates an observer based on the location of the selected input table target. The location of the input table target may be located in the same address space as the input table of the SQI, located in a different address space than the input table of the SQI, or located in a different address space of a different network device than the input table of the SQI. The SQS manager may generate observers linked to memory transport protocols and/or inter-device memory transport protocols to facilitate propagating information from the database to the input table of a SQI and/or notifying the SQI of changes to the database entry.

For example, if an input table is located in a different address space than the input table of the SQI, the SQS manager may generate a first observer, in the address space of the input table target, linked to a memory transport protocol between the address space of the input table target and the address space of the input table. The SQS may generate a second observer, in the address space of the input table, linked to the memory transport protocol between the address space of the input table target and the address space of the input table and thereby propagate changes to the input table target to the input table.

In a second example, if an input table is located in a different address space of a different network device, the SQS manager may generate a first observer, in the address space of the different network device of the input table target, linked to an inter-device memory transport protocol between the different network device and the network device on which the input table exists. The SQS may generate a second observer, in the address space of the input table, linked to the inter-device memory transport protocol between the different network device and the network device on which the input table exists and thereby propagate changes to the input table target to the input table.

In Step 828, the SQS manager determines whether all input table targets have been selected. The SQS manager may determine whether all input table targets have been selected based on the markings added in step 822. If all input table targets have been selected, e.g., are marked as selected, the method may end. If all input table targets have not been selected, e.g., all are not marked as selected, the method may proceed to Step 824.

Thus, the method shown in FIG. 8C may be used to generate observers to propagate changes to input table targets located in a database to an input table of a SQI.

While the method shown in FIG. 8C is illustrated as generating a unique observer for each input table target, one of ordinary skill in the art will appreciate that the method may be implemented by utilizing a single observer that observes multiple input table without departing from the invention.

FIG. 8D shows a flowchart in accordance with one or more embodiments of the invention. The method depicted in FIG. 8D may be used to generate modifiers in response to requests for SQIs from agents in accordance with one or more embodiments of the invention. One or more steps shown in FIG. 8D may be omitted, repeated, and/or performed in a different order among different embodiments.

In Step 830, a SQS manager of a network device obtains one or more output table targets. The output table targets may be one or more elements of a database on which a requested SQI is to propagate its output. The output table targets may be obtained from a request from an agent requesting the SQI.

In Step 832, the SQS manager selects one of the output table targets.

In Step 834, the SQS manager determines the location of the output table target selected in Step 832. The SQS manager may determine the location of the output table target by requesting the location from a database planner (210, FIG. 2) that manages the database (120, FIG. 2). The location of the output table target may be an element of a table of the database (120, FIG. 2).

In Step 836, the SQS manager generates a modifier based on the location of the output table target. The modifier may write data received from the SQI to the location of the output table target, e.g., one or more elements of a table of the database.

In Step 838, the SQS manager determines whether all output table targets have associated modifiers. If all output table targets have associated modifiers, the method may end. If all output table targets do not have associated modifiers, the method may proceed to Step 832.

Thus, the method shown in FIG. 8D may be used to generate modifiers to propagate output generated by the SQI to an output table of a database.

While the method shown in FIG. 8D is illustrated as generating unique modifiers for each output table target, one of ordinary skill in the art will appreciate that the method may be implemented by utilizing a single modifier associated with all of the output table targets without departing from the invention.

As discussed with respect to FIGS. 8C and 8D, observers and modifiers may be employed to read and/or write data to and/or from a database by a SQI. Similarly, observers and modifiers may be employed to read and/or write data to and/or from a database by an agent.

FIG. 8E shows a flowchart in accordance with one or more embodiments of the invention. The method depicted in FIG. 8E may be used to generate observers in response to requests to read data from a database by an agent in accordance with one or more embodiments of the invention. One or more steps shown in FIG. 8E may be omitted, repeated, and/or performed in a different order among different embodiments.

In Step 840, a database may obtain one or more observer targets. The database may obtain the observer targets based on a request from an agent. The request may include one or more elements of the database.

In Step 842, the database may determine the location of the observer targets. The database may determine the location of the observer targets by requesting the location of each observer target from a database planner (210, FIG. 2).

In Step 844, the database may generate one or more observers based on the location of the observed targets. As described with respect to FIG. 8B, multiple observers and/or memory transport may be used to propagate information from the observed targets of the database to the agent that requests the targets be observed in Step 840.

FIG. 8F shows a flowchart in accordance with one or more embodiments of the invention. The method depicted in FIG. 8F may be used to generate modifiers in response to requests to write data to a database by an agent in accordance with one or more embodiments of the invention. One or more steps shown in FIG. 8F may be omitted, repeated, and/or performed in a different order among different embodiments.

In Step 850, a database may obtain one or more modifier targets. The database may obtain the modifier targets based on a request from an agent. The request may include one or more elements of the database.

In Step 842, the database may determine the location of the modifier targets. The database may determine the location of the modifier targets by requesting the location of each modifier target from a database planner (210, FIG. 2).

In Step 844, the database may generate one or more modifiers based on the location of the modifier targets.

Figure 9A:
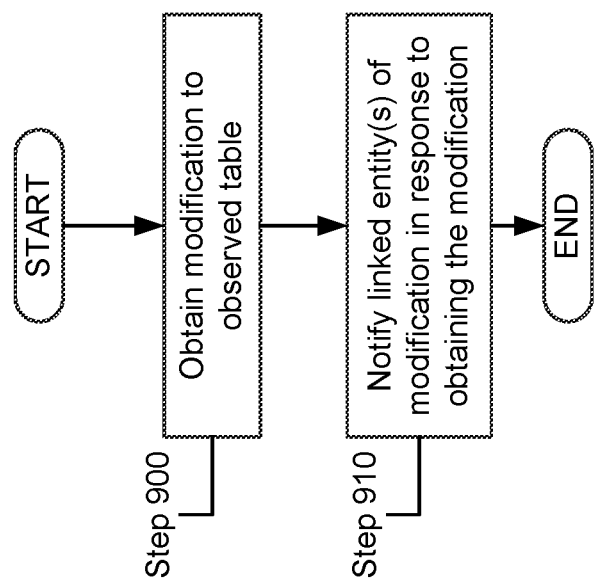
FIG. 9A shows a flowchart of a method of obtaining modifications to a table in accordance with one or more embodiments of the invention.

FIG. 9A shows a flowchart in accordance with one or more embodiments of the invention. The method depicted in FIG. 9A may be used by an observer to notify a linked entity of a change to an observed element of a database in accordance with one or more embodiments of the invention. One or more steps shown in FIG. 9A may be omitted, repeated, and/or performed in a different order among different embodiments.

In Step 900, an observer may obtain a modification to an observed table. As described with respect to FIG. 5A, each element of each table may include a subscription list. When an element of a table of a database is modified, the database may notify each observer listed in the subscription list of the modification. The observer may obtain the modification by the notification of change provided by the database.

In one or more embodiments of the invention, the observer may periodically poll the database to determine whether an observed element of a table has been modified. The observer may determine whether the observed element of the table of the database has been modified based on the write history of the element. In other words, the observer may review the write history of the element since the element was last observed by the observer for modification.

In Step 910, the observer may notify any linked entities of the modifications obtained in Step 900. As described with respect to FIGS. 7 and 8A, an observer may be linked to one or more entities. The entities may be input tables of SQIs, agents, or any other consumer of information. The observer may notify each linked entity of the modification of the element of the database the observer is observer is observing.

Figure 9B:
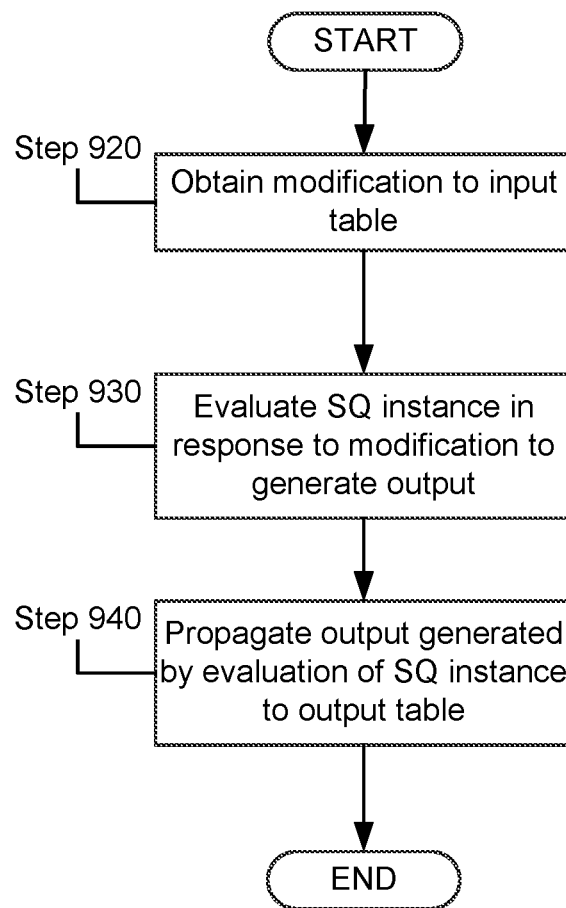
FIG. 9B shows a flowchart of a method of evaluating a SQI in accordance with one or more embodiments of the invention.

FIG. 9B shows a flowchart in accordance with one or more embodiments of the invention. The method depicted in FIG. 9B may be used by a SQI to evaluate a SQ in accordance with one or more embodiments of the invention. One or more steps shown in FIG. 9B may be omitted, repeated, and/or performed in a different order among different embodiments.

In Step 920, a SQI may obtain a modification to an input table. The modification may be obtained by an observer performing the method shown in FIG. 9A.

In Step 930, the SQI may execute the compiled query of the SQ in response to the modification. Executing the compiled query may generate output.

In Step 940, the SQI may propagate output generated by evaluation of the SQI to an output table. The output generated by the SQI may be propagated to an output table by the method shown in FIG. 9C.

Figure 9C:
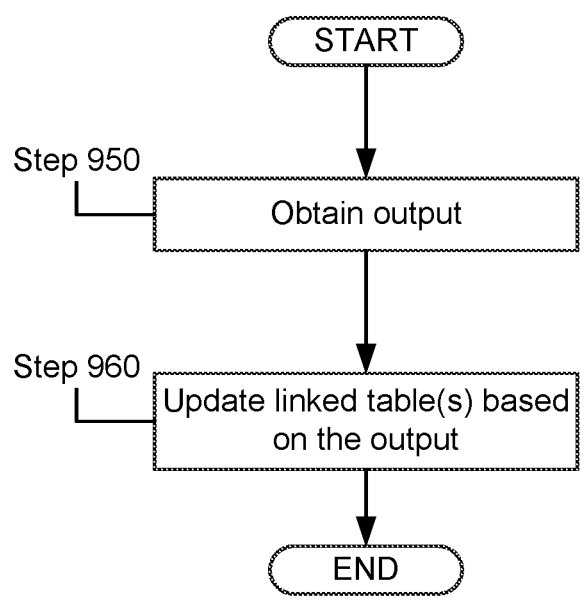
FIG. 9C shows a flowchart of a method of propagating output to a table in accordance with one or more embodiments of the invention.

FIG. 9C shows a flowchart in accordance with one or more embodiments of the invention. The method depicted in FIG. 9C may be used by a modifier to propagate output in accordance with one or more embodiments of the invention. One or more steps shown in FIG. 9C may be omitted, repeated, and/or performed in a different order among different embodiments.

In Step 950, a modifier may obtain an output. The modifier may obtain the output from a compiled query of a SQI, an agent, or any other entity.

In Step 960, the modifier updates one or more linked tables based on the obtained output.

Figure 10:
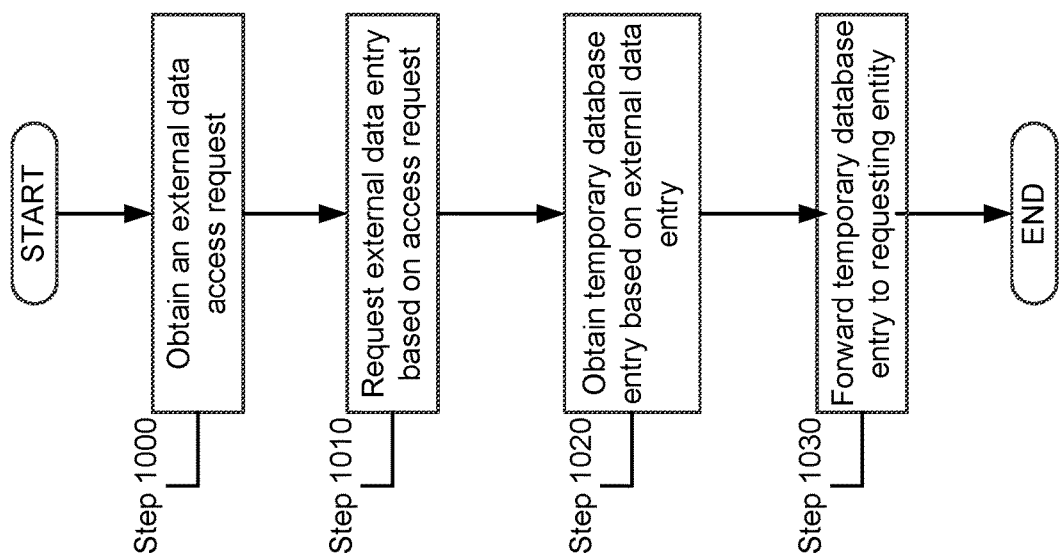
FIG. 10 shows a flowchart of a method of operating a database in accordance with one or more embodiments of the invention.

FIG. 10 shows a flowchart in accordance with one or more embodiments of the invention. The method depicted in FIG. 10 may be used by a database to provide access to external data in accordance with one or more embodiments of the invention. One or more steps shown in FIG. 10 may be omitted, repeated, and/or performed in a different order among different embodiments.

In Step 1000, a database obtains an external data access request. The access request may be obtained from, for example, a SQI or an agent. The access request may indicate an external data entry of the external data.

In Step 1010, the database requests and external data entry based on the access request. In one or more embodiments of the invention, the database may request the external data entry from an interpreter associated with the external data.

In Step 1020, the database obtains a temporary database entry (TDE) based on the external data entry. The database may obtain the TDE from an interpreter. The TDE may have a format that is the same as the format of the database. The TDE format may be different from the format of the external data entry associated with the TDE.

In Step 1030, the database may forward the TDE to the entity that requested access to the external data in step 1000.

The following example is for explanatory purposes and is not intended to limit the scope of the invention.

Example 1

Figure 11:
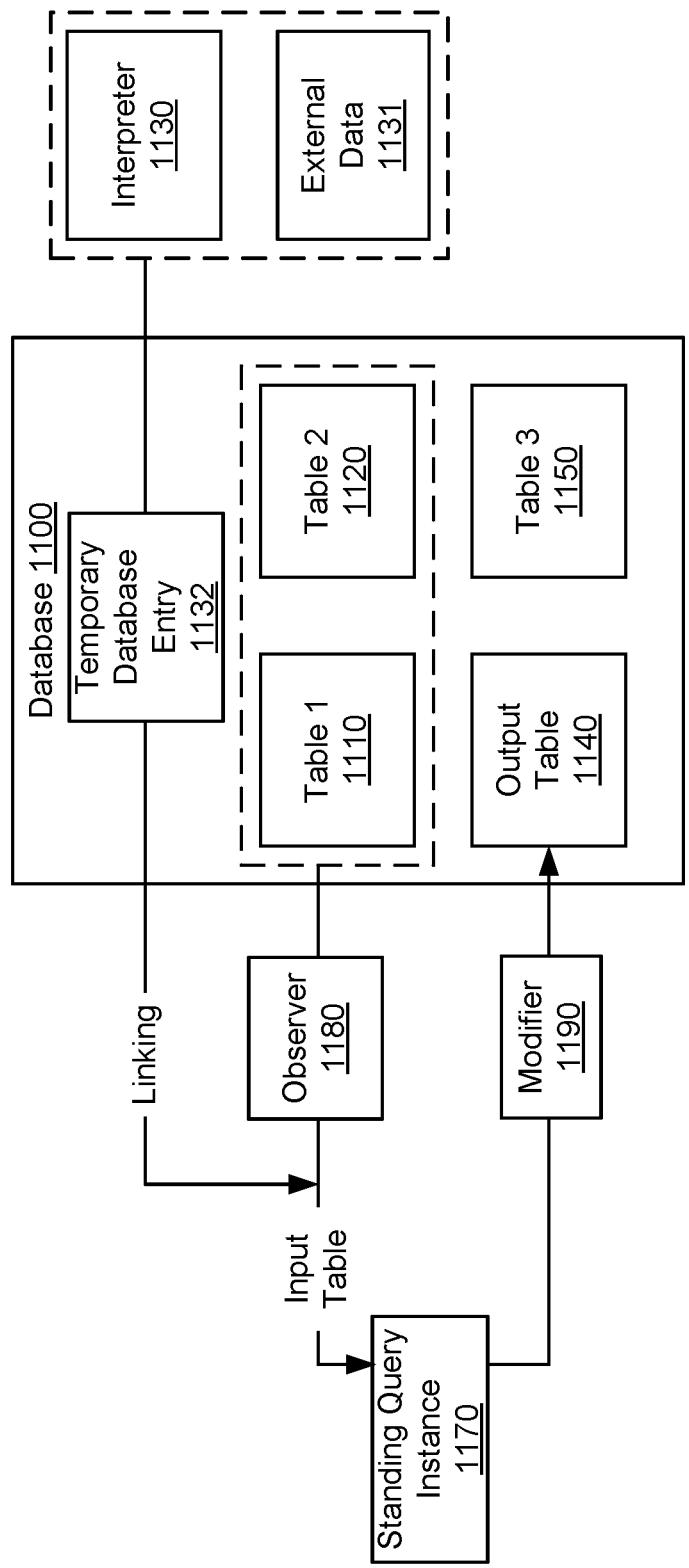
FIG. 11 shows a first example of a SQI interacting with a database in accordance with one or more embodiments of the invention.

A network device may include a database (1100) as shown in FIG. 11. The database (1100) may include three tables (1110, 1120, 1150), an output table (1140), and a temporary database entry (1132). An agent (not shown) may request a SQI be generated. In response to the request, a SQS manager of the network device (not shown) may perform the method shown in FIG. 8A and generate a SQI (1170). The SQS manager may perform the methods shown in FIGS. 8B-8F and generate an observer (1180), a modifier (1190), and a linking. Upon generation, the observer (1180) and modifier (1190) may register with the database (1100), as described with respect to FIG. 5A.

The request from the agent may indicate that the SQI is to operate on elements of Table 1 (1110), Table 2 (1120), and an external data (1131). Based on the request, the SQS manager may configure the observer (1180) to observe elements of the Table 1 (1110) and Table 2 (1120), as indicated by the dashed box.

The request from the agent may also indicate that the output generated by the SQI is to be stored in output table (1140) in the database. Based on the request, the SQS manager may configure the modifier (1190) to propagate results generated by the compiled query of the SQI to elements of the output table (1140).

When elements of Table 1 (1110) or Table 2 (1120) observed by the observer (1180) are modified, the database (1100) notifies the observer (1180) of the modifications and thereby the modifications are propagated to the input table of the SQI (1170). In response to the modification of the input table, the SQI (1170) will retrieve any external data entries listed in the input table of the SQI (1170). In this example, the input table includes an external data entry of the external data (1131). In response to this determination, the SQI sends a request to the database (1100) requesting the external data entry.

In response to the request, the database sends a message to an interpreter (1130) requesting the external data entry. In response to the request, the interpreter generates the temporary database entry (1132) and forwards the temporary database entry (1132) to the database. In response to receiving the temporary database entry (1132) the database (1100) forwards the temporary database entry (1132) to the compiled query of the SQI.

The SQI executes the compiled query of the SQI (1170) and thereby generate output based on the entries of the database and temporary database entries listed in the input table. The output generated by the compiled query of the SQI (1170) is forwarded to the modifier (1190) which subsequently propagates the output to elements of the output table (1140).

One or more embodiments of the invention may enable one or more of the following: i) a uniform method of retrieving data from a database and external data, ii) a method of providing access to a large external data by way of a database without incurring the computational and/or bandwidth overhead associated with the database, iii) reduced computational and/or bandwidth cost of producing incremental output of SQIs, and iv) improved database performance by reducing the total number of database entries by incorporating temporary database entries.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A network device, comprising:
    an interpreter programmed to provide an external data entry to a database and obtain a reacquired external data entry that is updated from the external data entry in response to a determination that a database entry in the database has become an updated database entry;
    a standing query instance (SQI) programmed to:
        obtain the database entry and the external data entry from the database;
        generate an output based on the database entry and the external data entry;
        generate, based on the determination that the database entry is updated to an updated database entry, an incremental output comprising the updated database entry and the reacquired external data entry; and
    an observer programmed to:
        make a determination that the database entry is updated to an updated database entry.

2. The network device of claim 1, wherein the temporary database external data entry is not stored in the database.

3. The network device of claim 1,
    wherein the database entry has a first format,
    wherein the external data entry has a second format,
    wherein the first format and the second format are different.

4. The network device of claim 3, wherein the external data entry has a third format,
    wherein the second format and the third format are different.

5. The network device of claim 3, wherein the external database entry has a third format,
    wherein the third format and the first format are the same.

6. The network device of claim 1, wherein the SQI generates the output in response to the determination that the database entry is updated to an updated database entry.

7. The network device of claim 1, further comprising:
    an observer programmed to notify a second SQI of a change to the database entry;
    a second observer programmed to notify the second SQI of a change to a second database entry; and
    the second SQI programmed to:
        generate a second output in response to the notification from one selected from the group consisting of the observer and the second observer.

8. The network device of claim 7, wherein the output of the second SQI is based on the external data entry and the database entry when the second SQI is notified by the observer.

9. The network device of claim 8, wherein the output of the second SQI is based on the external data entry and the second database entry when the second SQI is notified by the second observer.

10. The network device of claim 1, further comprising:
    a standing query service manager (SQSM) programmed to:
        obtain a new SQI request; and
        generate a new SQI based on the new SQI request.

11. The network device of claim 10, wherein the new SQI request specifies:
    an input table comprising a second database entry and the external data entry.

12. The network device of claim 11, wherein the SQSM is further programmed to:
    generate a new observer that notifies the new SQI of a change to the second database entry; and
    generate a link between the new SQI and the external data entry.

13. The network device of claim 12, wherein the new SQI is programmed to:
    obtain the second database entry and the external data entry; and
    generate a second output based on the second database entry and the external data entry,
    wherein the link is based on the external data entry.

14. A method of operating a network device, comprising:
    obtaining, by a standing query service manager (SQSM) of the network device, a first standing query instance (SQI) request specifying an input table, wherein the input table comprises a database entry of a database and an external data entry of an external data;
    generating, by the SQSM, a SQI comprising:
        a SQI input table,
        a compiled query that, when executed, produces an output based on the SQI input table;

making a first determination, by the SQSM, that the SQI input table includes the database entry in response to generating the SQI;

generating, by the SQSM, an observer programmed to notify the first SQI of a change to the database entry in response to the first determination;

generating, by the SQSM, a link between the SQI input table and the external data entry in response to the first determinations;

making a second determination, by the observer, that the database entry is updated to an updated database entry;

obtaining, in response to the second determination that the database entry has become an updated database entry, a reacquired external data entry that is updated from the external data entry; and generating, by the SQS manager, a second link between the SQI input table and the reacquired external data entry in response to the second determination.

15. The method of claim 14, wherein the database entry has a first format, wherein the external data entry has a second format, and wherein the first format and second format are different.

16. The method of claim 14, wherein the link is a temporary database entry of the database that is based on the external data entry.

17. A method of operating a network device, comprising:

obtaining, by a standing query instance (SQI), a database entry and a temporary database entry from a database, wherein the temporary database entry is based on an external data entry of an external data; and generating, by a compiled query of the SQI, an output based on the database entry and the temporary database entry;

receiving a notification from an observer that the database entry is updated to an updated database entry;

obtaining, by the SQI, the updated database entry and a second temporary database entry from a database, wherein the second temporary database entry is based on a reacquired external data entry of the external data that is updated from the external data entry; and generating, by the compiled query of the SQI, an incremental output based on the updated database entry and the second temporary database entry.

18. The method of claim 17, wherein the temporary database entry is not stored in the database, and wherein the external data is not stored in the database.

19. The method of claim 17, wherein the database entry has a first format, wherein the external data entry has a second format, and wherein the first format and the second format are different.

20. The method of claim 19, wherein the temporary database entry has a third format, and wherein the second format and the third format are different.

* * * * *

UNITED STATES PATENT AND TRADEMARK OFFICE
CERTIFICATE OF CORRECTION

PATENT NO. : 10,860,568 B2
APPLICATION NO. : 15/274143
DATED : December 8, 2020
INVENTOR(S) : Michael Greenwald et al.

Page 1 of 1

It is certified that error appears in the above-identified patent and that said Letters Patent is hereby corrected as shown below:

In the Claims

Claim 2, Column 20, Line 1-2, the words "temporary database" should be deleted

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*